United States Patent
Wei et al.

(10) Patent No.: US 12,206,506 B2
(45) Date of Patent: Jan. 21, 2025

(54) METHODS AND APPARATUSES FOR HANDLING HYBRID AUTOMATIC REPEAT REQUEST FEEDBACK TRANSMISSIONS

(71) Applicant: SHARP KABUSHIKI KAISHA, Sakai (JP)

(72) Inventors: Chia-Hung Wei, Taipei (TW); Hsin-Hsi Tsai, Taipei (TW); Chien-Chun Cheng, Taipei (TW); Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 271 days.

(21) Appl. No.: 17/630,009

(22) PCT Filed: Jul. 27, 2020

(86) PCT No.: PCT/CN2020/104958
§ 371 (c)(1),
(2) Date: Jan. 25, 2022

(87) PCT Pub. No.: WO2021/023049
PCT Pub. Date: Feb. 11, 2021

(65) Prior Publication Data
US 2022/0263608 A1    Aug. 18, 2022

Related U.S. Application Data

(60) Provisional application No. 62/882,227, filed on Aug. 2, 2019.

(51) Int. Cl.
*H04L 1/18*    (2023.01)
*H04L 1/1812*    (2023.01)
(Continued)

(52) U.S. Cl.
CPC .......... *H04L 1/1854* (2013.01); *H04L 1/1812* (2013.01); *H04L 1/1887* (2013.01); *H04W 72/23* (2023.01)

(58) Field of Classification Search
CPC . H04W 72/23; H04W 72/231; H04W 72/232; H04L 1/1854; H04L 1/1858;
(Continued)

(56) References Cited

U.S. PATENT DOCUMENTS

2015/0326354 A1    11/2015 Li et al.
2018/0145796 A1    5/2018 Liang et al.
(Continued)

FOREIGN PATENT DOCUMENTS

CN        104396174 A    3/2015
CN        106301670 A    1/2017
(Continued)

OTHER PUBLICATIONS

Ericsson, "HARQ-ACK bundling for FeMTC", R1-1611099, 3GPP TSG-RAN WG1 meeting #87, Reno, Nevada, USA, Nov. 14-18, 2016.
(Continued)

*Primary Examiner* — Phong La
(74) *Attorney, Agent, or Firm* — ScienBiziP, P.C.

(57) ABSTRACT

A method for handling Hybrid Automatic Repeat reQuest (HARQ) feedback transmissions includes a User Equipment (UE) receiving, from a Base Station (BS), Downlink Control Information (DCI) on a Physical Downlink Control Channel (PDCCH). The DCI schedules a reception of Downlink (DL) data on a Physical Downlink Shared Channel (PDSCH). The method further includes the UE determining whether to transmit a HARQ feedback for the DL data according to the DCI.

6 Claims, 8 Drawing Sheets

(51) Int. Cl.
*H04L 1/1829* (2023.01)
*H04L 1/1867* (2023.01)
*H04W 72/12* (2023.01)
*H04W 72/23* (2023.01)

(58) Field of Classification Search
CPC ... H04L 1/1861; H04L 1/1864; H04L 1/1812; H04L 1/18; H04L 1/1887; H04L 1/189; H04L 1/1896
See application file for complete search history.

(56) References Cited

U.S. PATENT DOCUMENTS

| | | | |
|---|---|---|---|
| 2018/0343653 A1* | 11/2018 | Guo | H04W 72/542 |
| 2019/0052413 A1 | 2/2019 | Babaei et al. | |
| 2019/0074935 A1 | 3/2019 | Babaei et al. | |
| 2019/0363842 A1 | 11/2019 | Fu et al. | |
| 2020/0077369 A1* | 3/2020 | Zhang | H04L 5/0053 |
| 2020/0092073 A1* | 3/2020 | Papasakellariou | H04L 5/0053 |
| 2020/0374918 A1* | 11/2020 | Ang | H04W 72/23 |
| 2021/0351837 A1* | 11/2021 | Nader | H04B 7/0693 |

FOREIGN PATENT DOCUMENTS

| | | | | |
|---|---|---|---|---|
| CN | 107347002 A | | 11/2017 | |
| CN | 108306720 A | | 7/2018 | |
| CN | 108631964 A | * | 10/2018 | H04L 1/1806 |
| CN | 109474371 A | | 3/2019 | |
| CN | 111585727 B | * | 11/2021 | H04L 1/1812 |
| CN | 110830172 B | * | 6/2022 | H04L 1/1607 |
| JP | 7407810 B2 | * | 1/2024 | H04L 1/0073 |
| KR | 20190056933 A | | 5/2019 | |
| WO | WO 2018203722 | * | 5/2018 | |
| WO | WO 2019215794 | * | 5/2018 | |
| WO | 2018203722 A1 | | 11/2018 | |
| WO | 2019/050363 A1 | | 3/2019 | |
| WO | WO-2019215794 A1 | * | 11/2019 | H04L 5/0044 |
| WO | WO-2020026305 A1 | * | 2/2020 | H04L 1/0003 |

OTHER PUBLICATIONS

Samsung, "Corrections on CA operation", R1-1801989, 3GPP TSG RAN WG1 Meeting #92, Athens, Greece, Feb. 26-Mar. 2, 2018.
ITRI, "HARQ enhancements for NR-U", 3GPP TSG RAN WG1 #97 Reno, USA, May 13-17, 2019, R1-1907309.
3GPP TS 38.213, "3rd Generation Partnership Project; Technical Specification Group Radio Access Network; NR; Physical layer procedures for control (Release 15)", V15.12.0 (Dec. 2020).
3GPP TSS 38.321, "3rd Generation Partnership Project; Technical Specification Group Radio Access Network; NR; Medium Access Control (MAC) protocol specification (Release 15)", V15.11.0 (Dec. 2020).
3GPP TS 38.212, "3rd Generation Partnership Project; Technical Specification Group Radio Access Network; NR; Multiplexing and channel coding (Release 16)", V16.4.0 (Dec. 2020).
3GPP TS 38.331, "3rd Generation Partnership Project; Technical Specification Group Radio Access Network; NR; Radio Resource Control (RRC) protocol specification (Release 15)", V15.12.0 (Dec. 2020).
3GPP TS 38.214, "3rd Generation Partnership Project; Technical Specification Group Radio Access Network; NR; Physical layer procedures for data (Release 15)", V15.11.0 (Sep. 2020).

* cited by examiner

METHODS AND APPARATUSES FOR HANDLING HYBRID AUTOMATIC REPEAT REQUEST FEEDBACK TRANSMISSIONS

CROSS-REFERENCE TO RELATED APPLICATION(S)

The present disclosure is the national stage application, filed under 35 U.S.C. § 371, of International Patent Application No. PCT/CN2020/104958, filed on Jul. 27, 2020, which claims the benefit of and priority to U.S. Provisional Patent Application Ser. No. 62/882,227, filed on Aug. 2, 2019, the contents of all of which are hereby fully incorporated herein by reference for all purposes.

FIELD

The present disclosure generally relates to wireless communications, and more particularly, to methods and apparatuses for handling Hybrid Automatic Repeat reQuest (HARQ) feedback transmissions in a communication system.

BACKGROUND

With the tremendous growth in the number of connected devices and the rapid increase in user/network traffic volume, various efforts have been made to improve different aspects of wireless communication for the next generation wireless communication systems, such as the fifth generation (5G) New Radio (NR) system, by improving data rate, latency, reliability and mobility.

The 5G NR system is designed to provide flexibility and configurability to optimize the network services and types, accommodating various use cases, such as enhanced Mobile Broadband (eMBB), massive Machine-Type Communication (mMTC), and Ultra-Reliable, and Low-Latency Communication (URLLC).

However, as the demand for radio access continues to increase, there is a need for further improvements in the art.

SUMMARY

The present disclosure is directed to methods and apparatuses for handling HARQ feedback transmissions in a communication system.

According to an aspect of the present disclosure, a method performed by a User Equipment (UE) is provided. The method includes the UE receiving, from a Base Station (BS), Downlink (DL) Control Information (DCI) on a Physical Downlink Control Channel (PDCCH). The DCI schedules a reception of DL data on a Physical Downlink Shared Channel (PDSCH). The method further includes the UE determining whether to transmit a HARQ feedback for the DL data according to the DCI.

According to another aspect of the present disclosure, a User Equipment (UE) is provided. The UE includes at least one memory storing a set of instructions, and at least one processor coupled to the at least one memory. The at least one processor is configured to execute the set of instructions to receive DCI on a PDCCH from a BS. The DCI schedules a reception of DL data on a PDSCH. The at least one processor is further configured to determine whether to transmit a HARQ feedback for the DL data according to the DCI.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
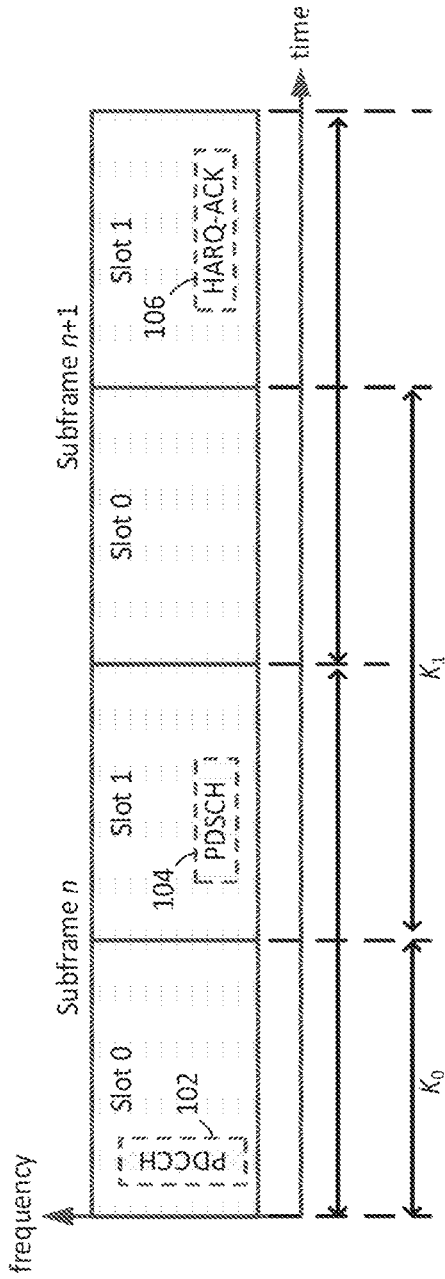
FIG. 1 is a schematic diagram illustrating a resource location of a PDSCH and a resource of HARQ feedback transmission which are determined based on the parameters $K_0$ and $K_1$ indicated by a PDCCH, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may differ in other respects, and thus shall not be narrowly confined to what is shown in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, a LTE-Advanced (LTE-A) system, or a LTE-Advanced Pro system) typically includes at least one BS, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM EDGE Radio Access Network (GERAN), an ng-eNB as in an E-UTRA BS in connection with the SGC, a next generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. In some implementations, each cell (often referred to as a serving cell) may provide services to serve one or more UEs within its radio coverage, (e.g., each cell schedules the DL and optionally Uplink (UL) resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). PCell may refer to the SpCell of an MCG. Primary Secondary Cell (PSCell) may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in $3^{rd}$ Generation Partnership Project (3GPP) may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. In addition, a sidelink resource may also be provided in an NR frame to support ProSe services.

In an NR wireless communication system, a DL data reception at the UE side may be achieved by monitoring a Physical Downlink Control Channel (PDCCH) and find a possible assignment on the PDCCH. For example, the assignment may be UE-specific Downlink Control Information (DCI) that is found on the PDCCH (e.g., a candidate PDCCH). The DCI may indicate a time-frequency resource location for a DL data reception on a PDSCH. In addition, the DCI may indicate the timing when the UE should perform a HARQ feedback transmission (e.g., HARQ-ACKnowledgement (ACK) transmission) for the DL data reception on the PDSCH.

FIG. 1 is a schematic diagram illustrating a resource location of a PDSCH and a resource of HARQ feedback transmission which are determined based on the parameters $K_0$ and $K_1$ indicated by a PDCCH, in accordance with an implementation of the present disclosure.

As shown in FIG. 1, the parameter $K_0$ may denote a slot offset between the slot (e.g., slot 0 of subframe n) containing the PDCCH (e.g., PDCCH 102) and the slot (e.g., slot 1 of subframe n) containing the PDSCH (e.g., PDSCH 104) that is indicated/scheduled by DCI carried by the PDCCH (e.g., PDCCH 102). Thus, in the example of FIG. 1, $K_0$=1 (e.g., slot). On the other hand, the parameter $K_1$ may denote a slot offset between the slot (e.g., slot 1 of subframe n) containing the PDSCH (e.g., PDSCH 104) and the slot (e.g., slot 1 of subframe n+1) that the UE is indicated by the BS to perform the HARQ feedback transmission for PDSCH 104 on an UL resource configured by the BS (e.g., UL resource 106). In the example of FIG. 1, $K_1$=2 (e.g., slots). The values of the $K_0$ and $K_1$ parameters may be indicated to the UE via DCI. It should be noted that even though each subframe includes only two slots in the implementation illustrated in FIG. 1, any number of slots may be included in one subframe in some other implementations of the present application. In addition, the number of slots contained in each subframe may be dependent on the numerology of the numerology configuration.

Figure 2:
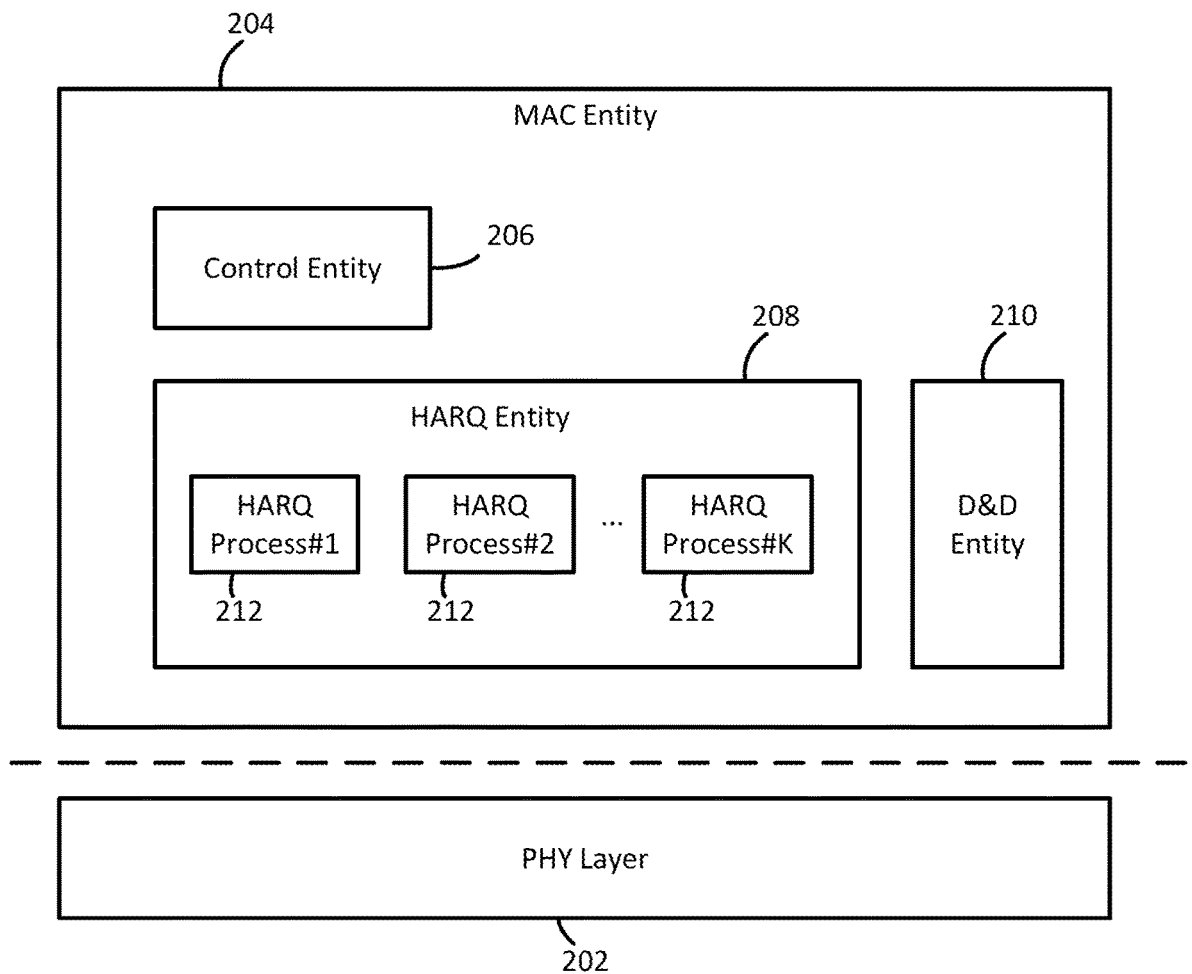
FIG. 2 is a schematic diagram illustrating an architecture of a protocol stack including a Medium Access Control (MAC) entity and a Physical (PHY) layer of a UE, in accordance with an example of the present application.

FIG. 2 is a schematic diagram illustrating an architecture of a protocol stack including a MAC entity and a PHY layer of a UE, in accordance with an example of the present application.

As shown in FIG. 2, the UE may include a PHY layer 202 and at least one MAC entity 204 (e.g., among other entities that are not shown) that may include a control entity 206, a HARQ entity 208 and a Demodulation and Decoding (D&D) entity 210. The control entity 206 may represent the MAC entity/layer of the UE except the HARQ entity 208 and the D&D entity 210. The HARQ entity 208 may maintain K HARQ processes 212 (e.g., HARQ processes #1 to HARQ processes #K, where K is a natural integer) with each HARQ process 212 having a HARQ process Identity (ID). The D&D entity 210 may be responsible for disassembling and demultiplexing the received MAC Protocol Data Unit (PDU). It should be noted that the terms "HARQ process ID," "HARQ ID," and "HARQ process number" may be interchangeable in some implementations of the present disclosure.

In addition, it should be noted that the implementation in FIG. 2 is shown for illustrative purposes only, and is not meant to limit the scope of the present application. For example, in some other implementations, more or less entities in the UE may be engaged in the processing of the DL process.

Figure 3:
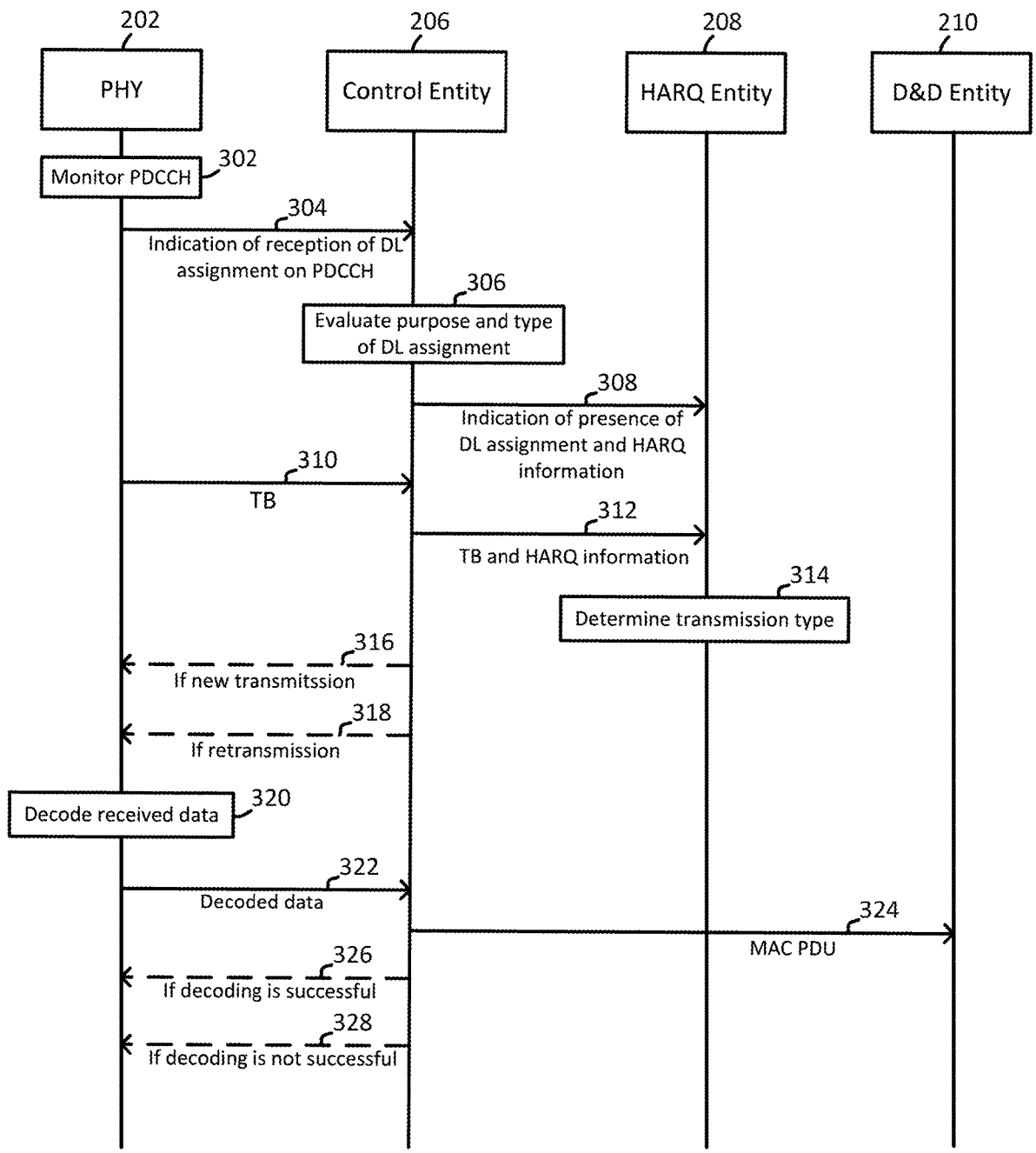
FIG. 3 is a flowchart of a DL method/process performed by a UE, in accordance with an implementation of the present disclosure.

FIG. 3 is a flowchart of a DL process performed by a UE, in accordance with an implementation of the present disclosure. For the convenience of discussion and illustration, only the entities included in the protocol stack of the UE illustrated in FIG. 2 are shown in FIG. 3 with the same label.

In action 302 (Step 1), the PHY layer 202 of the UE may monitor PDCCH candidates according to the gNB's configuration and thus obtain a DL assignment from a PDCCH by decoding the DCI (e.g., with a Cyclic Redundancy Check (CRC) scrambled by a specific Radio Network Temporary Identifier (RNTI) for the UE on the PDCCH). For example, the specific RNTI may be a Cell-RNTI (C-RNTI). In some implementations, the UE may use the DL assignment to determine the time location of the time slot including the PDSCH and/or the time location of the time slot including the resource for transmitting the HARQ feedback. For example, the DL assignment may include the $K_0$ and $K_1$ parameters, as described above.

In action 304 (Step 2), the PHY layer 202 may provide an indication of the reception of the DL assignment on the PDCCH to the MAC layer of the UE (e.g., the control entity 206 of MAC entity 204 illustrated in FIG. 2). In some implementations, the indication of the reception of the DL assignment may include a PDSCH reception assignment and the HARQ information that contains a New Data Indicator (NDI).

In action 306 (Step 3), the control entity 206 of the UE may evaluate the purpose and type of the DL assignment based on the indication of the reception of the DL assignment from PHY layer 202. For example, the MAC entity may determine whether the DL assignment is for the MAC entity's C-RNTI, and/or whether the NDI has been toggled.

In action 308 (Step 4), the control entity 206 of the UE may inform the HARQ entity 208 of the presence of the DL assignment and may provide the HARQ information (e.g., including a HARQ process ID) to the HARQ entity 208.

In action 310 (Step 5), at a time after the end of the PDSCH reception (e.g., at the end of the last symbol of the PDSCH in the time domain), the PHY layer 202 may provide a Transport Block (TB) received on the PDSCH to the MAC layer of the UE (e.g., to the control entity 206 of MAC entity 204).

In action 312 (Step 6), the control entity 206 may provide the TB and the HARQ information that indicates a HARQ process (e.g., the HARQ process 212 illustrated in FIG. 2) to the HARQ entity 208.

In action 314 (Step 7), the HARQ entity 208 may determine the transmission type of the TB (e.g., retransmission or new transmission). For example, when performing the HARQ process, the HARQ entity 208 may determine whether the NDI has been toggled and whether the DL assignment is a new transmission.

If the DL assignment is determined to be a new transmission in action 314, then, in action 316 (Step 8), the control entity 206 may instruct the PHY layer 202 to decode the received data.

If the DL assignment is determined to be a retransmission in action 314 and the received data has not been successfully decoded by the PHY layer 202, then in action 318 (Step 8'), the control entity 206 may instruct the PHY layer 202 to perform a soft combining process in which the PHY layer 202 may combine the received data with the data currently stored in a soft buffer for this TB and then attempt to decode the combined data.

In action 320 (Step 9), the PHY layer 202 may decode the received data according to the instruction from the control entity 206, and in action 322, provide the decoded data to the MAC layer of the UE (e.g., the control entity 206).

In action 324 (Step 10), if the received data is successfully decoded in action 320 (Step 9), the MAC layer of the UE (e.g., the control entity 206 of the MAC layer) may provide the MAC PDU corresponding to the decoded data to the D&D entity 210. The D&D entity 210 may then disassemble and demultiplex the received MAC PDU.

In addition, if the received data is successfully decoded in action 320, the MAC layer of the UE (e.g., the control entity 206) may further instruct the PHY layer 202 to generate the HARQ feedback (e.g., an ACK/Negative Acknowledgement (NACK)) for the received data in the TB in action 326 (Step 11).

Conversely, if the received data is not successfully decoded in action 320, the MAC layer of the UE (e.g., the control entity 206) may instruct the PHY layer 202 to replace the data stored in the soft buffer with the data that the MAC entity instructs PHY layer 202 to decode. Then, the MAC layer of the UE (e.g., the control entity 206) may instruct the PHY layer 202 to generate the HARQ feedback of the data in the TB in action 328 (Step 11').

It should be noted that although actions 302, 304, 306, 308, 310, 312, 314, 316, 318, 320, 322, 324, 326 and 328 are delineated as separate actions in FIG. 3, these separately delineated actions should not be construed as necessarily order dependent. The order in which the actions are performed in FIG. 3 is not intended to be construed as a limitation, and any number of the described actions may be combined in any order to implement the method, or an alternate method. Moreover, one or more of actions 302, 304, 306, 308, 310, 312, 314, 316, 318, 320, 322, 324, 326 and 328 in the DL process may be omitted in some of the present implementations. For example, action 310 (Step 5) may be combined with, or merged into, action 304 (Step 2). In such a circumstance, the PHY layer of the UE may deliver/provide the DL assignment and the corresponding HARQ information, as well as the received TB, to the MAC entity after the UE receives the PDSCH.

Section A—Indication of HARQ Feedback Transmission

In this section, examples of how a BS (e.g., gNB) indicates to a UE whether to perform a HARQ feedback transmission for a PDSCH reception are provided.

For example, during a Radio Resource Control (RRC) (re)configuration procedure and/or a dynamic DL scheduling, a BS may indicate to a UE whether to perform a HARQ feedback transmission for each PDSCH reception dynamically scheduled by the BS. Examples of the operations of the UE and the BS are described in Cases A1 to A12.

Case A1

In Case A1, a BS may indicate to a UE whether to perform a HARQ feedback transmission for a PDSCH reception dynamically scheduled by the BS using an indicator. Such indicator may be included in the DCI that is provided, for example, in a dynamic scheduling (e.g., received form the BS). The indicator may be implemented explicitly or implicitly for indicating whether a HARQ feedback transmission should be performed or not.

In some implementations, the indicator may include one or more DCI fields. For example, the indicator may include a DCI field (e.g., the HARQ process number field, e.g., as provided in the 3GPP Technical Specification (TS) 38.212) that indicates a HARQ process number. If the value of the HARQ process number is within a specific range or is out of a valid range, the UE may not perform a HARQ feedback transmission for the corresponding PDSCH reception.

In some implementations, the specific range/valid range may be determined by the UE through a pre-RRC configuration that is carried by a DL RRC message. In some implementations, the specific range/valid range may be dependent upon UE's implementation. For example, the specific range may be determined by a parameter (e.g., an Information Element (IE) denoted as nrofHARQ-ProcessesForNA) that is configured by the BS, where the value of the nrofHARQ-ProcessesForNA may be the number of HARQ processes for a PDSCH reception (e.g., of a serving cell) of which the corresponding HARQ feedback transmission is not needed to be performed.

In some implementations, the specific range may start from the value of (nrofHARQ-ProcessesForPDSCH−nrofHARQ-ProcessesForNA+1) and end at the value of nrofHARQ-ProcessesForPDSCH. The nrofHARQ-ProcessesForPDSCH may indicate the number of HARQ processes to be used on a PDSCH of a serving cell. For example, the value of the nrofHARQ-ProcessesForPDSCH may be set to n2 when there are 2 HARQ processes to be used on a PDSCH, be set to n4 when there are 4 HARQ processes to be used on the PDSCH, and so on.

In some implementations, the specific range may start from the value of (nrofHARQ-Processes+1) and end at the value of (nrofHARQ-Processes+nrofHARQ-ProcessesForNA). The nrofHARQ-Processes may be (or indicate) the number of HARQ processes configured for a serving cell (e.g., as defined in the 3GPP TS 38.331).

In some implementations, the specific range may be [0 to (nrofHARQ-Processes-nrofHARQ-ProcessesForNA+1)].

In some implementations, the specific range may be [0 to (nrofHARQ-ProcessesForNA-1)].

In some implementations, the specific range may be [(nrofHARQ-ProcessesForNA+1) to nrofHARQ-Processes].

In some implementations, the nrofHARQ-ProcessesForNA may be configured by the BS on a serving cell basis, a Semi-Persistent Scheduling (SPS) configuration basis, or a Bandwidth Part (BWP) basis.

In some implementations, a parameter (e.g., nrofHARQ-ProcessesForNA-like) may be used to indicate the specific range (e.g., for a BWP or a serving cell). The UE may not perform HARQ feedback transmissions for the HARQ processes with their HARQ process IDs within the specific range.

In some implementations, the specific range for dynamic scheduling and the specific range for SPS may be the same or separate ranges.

In some implementations, if a UE is not configured with the nrofHARQ-ProcessesForNA (or the nrofHARQ-ProcessesForNA is absent), a default/predefined value may be applied by the UE to determine the number of HARQ processes to be used in a PDSCH of a serving cell. In some implementations, the default/predefined value may be indicated by an RRC configuration.

In some implementations, if the parameter dl-DataToUL-ACK (e.g., as specified in the 3GPP TS 38.331) is not configured in a PUCCH configuration (e.g., PUCCH-Config), the UE may not need to report the ACK to the BS. In this situation, the BS may prohibit the UE from reporting the ACK in one or more configured UL BWPs. In some implementations, the parameter dl-DataToUL-ACK may be (or include) a list of entries, where each entry in the list may indicate a time offset from a present PDSCH to a DL ACK (e.g., a HARQ feedback for the present PDSCH). In some implementations, the PUCCH configuration may be configured by the BS on an UL BWP basis. In some implementations, the dl-DataToUL-Ack may be configured by the BS via a DL RRC message.

In some implementations, a PDSCH-to-HARQ feedback timing indicator (e.g., as defined in the 3GPP TS 38.331 and 3GPP TS 38.212) contained in the DCI may map to a total of K entries. If the number of entries in the dl-DataToUL-Ack is L which is less than K, the PDSCH-to-HARQ_feedback timing indicator may be used as an indication of "no HARQ feedback is needed" for the UE by indicating at least one of the K-L remaining entries not included in the dl-DataToUL-Ack. For example, if the dl-DataToUL-Ack includes three entries (e.g., '00', '01' and '10') in total, and the PDSCH-to-HARQ_feedback timing indicator is a 2-bit indicator which is capable of indicating 4 entries (e.g., '00', '01', '10', and '11'), the PDSCH-to-HARQ_feedback timing indicator may be used to inform the UE of one of the following events (a1) to (a6) by indicating the remaining entry (e.g., '11') that is not included in the dl-DataToUL-Ack:

(a1) the HARQ feedback (e.g., an ACK/NACK) is not needed to be transmitted;
(a2) the HARQ feedback transmission for the corresponding BWP/serving cell/serving cell group/UE is disabled;
(a3) the HARQ feedback transmission for the corresponding BWP/serving cell/serving cell group/UE is disabled for a configured/predefined period of time;
(a4) the HARQ feedback for the corresponding BWP/serving cell/serving cell group/UE is disabled until the UE receives an enabling signaling from the BS;
(a5) the HARQ feedback transmission for the corresponding BWP/serving cell/serving cell group/UE is enabled; or
(a6) the HARQ feedback transmission for the corresponding BWP/serving cell/serving cell group/UE is enabled for a configured/predefined period of time.

In some implementations, the PDSCH-to-HARQ_feedback timing indicator may be used to inform the UE of one of the events (a1) to (a6) by indicating a default entry of the remaining entries that map to the PDSCH-to-HARQ_feedback timing indicator and are not included in the dl-DataToUL-Ack. In some implementations, the default entry may be the last entry of the remaining entries. For example, the last entry may have the largest index number among all remaining entries. In some implementations, the default entry may be the first entry of the remaining entries. For example, the first entry may have the smallest index number among all remaining entries. In some implementations, the default entry may have an index number that is preconfigured by the BS. For example, the index number may be configured on a BWP/serving cell/cell group/UE basis.

In some implementations, a UE may be configured with the dl-DataToUL-ACK and receive the DCI format 1_0. The PDSCH-to-HARQ_feedback timing indicator in the DCI (e.g., with the DCI format 1_0) may indicate a slot offset for a HARQ feedback transmission (e.g., transmission of an ACK/NACK). If the slot offset indicated by the PDSCH-to-HARQ_feedback timing indicator does not appear in both a default set of slot offsets (e.g., {1, 2, 3, 4, 5, 6, 7, 8}) and a set of slot offsets that is provided by the dl-DataToUL-ACK for an active DL BWP of a serving cell, the PDSCH-to-HARQ_feedback timing indicator may be used to inform the UE of one of the events (a1) to (a6).

In some implementations, if the dl-DataToUL-ACK is not configured in the PUCCH-Config (e.g., per UL BWP) and if the PDSCH receptions are scheduled by the DCI format 1_1, the UE may not perform the corresponding HARQ feedback transmission(s) for the PDSCH reception(s).

In some implementations, when one or more conditions in the above-mentioned implementations are satisfied, the UE may be informed of one of the events (a1) to (a6).

In some implementations, whether a UE performs the HARQ feedback transmission may be dependent upon whether the resource allocation (e.g., in the time domain) of a PDSCH is determined by an RRC configuration or by a predefined resource allocation table(s) from the PHY layer (e.g., as defined in the 3GPP TS 38.214). In this implementation, the RRC configuration or the predefined resource allocation table(s) may be considered as an implicit indicator that indicates to the UE whether to perform the HARQ feedback transmission.

In some implementations, the RRC configuration may include at least one PDSCH time domain resource allocation table (e.g., an IE denoted as pdsch-TimeDomainAllocationList).

In some implementations, there may be multiple PDSCH time domain resource allocation tables (e.g., pdsch-TimeDomainAllocationList). For example, according to at least one of the following factors (b1) to (b5), the UE may determine whether the resource allocation in the time domain for the PDSCH is determined by the RRC configuration (e.g., pdsch-TimeDomainAllocationList) or by the resource allocation table(s) in the PHY layer:

(b1) the type of PDCCH search space that carries the DCI;
(b2) the type of RNTI that is scrambled with the CRC bits of the DCI;
(b3) the Synchronization Signal (SS)/Physical Broadcast Channel (PBCH) Block (SSB) and the Control Resource Set (CORESET) multiplexing pattern;
(b4) whether the common PDSCH configuration (e.g., an IE denoted as pdsch-ConfigCommon) includes the pdsch-TimeDomainAllocationList; and
(b5) whether the PDSCH configuration (e.g., an IE denoted as pdsch-Config) includes the pdsch-TimeDomainAllocationList.

In some implementations, whether a UE performs the HARQ feedback transmission may be dependent upon whether the resource allocation (e.g., in the time domain) of a PDSCH is determined based on an RRC configuration which includes the IE pdsch-TimeDomainAllocationListNA or based on a predefined resource allocation table(s) in the PHY layer. In some such implementations, the RRC configuration or the predefined resource allocation table(s) may be considered as an implicit indicator that indicates to the UE whether to perform the HARQ feedback transmission. For example, the UE may not transmit a corresponding HARQ feedback when the UE determines that the resource allocation in the time domain for the PDSCH is determined based on the pdsch-TimeDomainAllocationListNA and/or the predefined resource allocation table(s). Compared to the pdsch-TimeDomainAllocationList, the pdsch-TimeDomainAllocationListNA may be a separate IE/parameter, in which the resource allocation(s) is listed, may be specific to the PDSCH(s) that the corresponding HARQ feedback transmission(s) are not needed to be performed. Similarly, the predefined resource allocation table(s) may be specific to the PDSCH(s) that the corresponding HARQ feedback transmission(s) are not needed to be performed. In some implementations, the UE may be configured with multiple PDSCH time domain resource allocation tables (e.g., including at least onepdsch-TimeDomainAllocationListNA and/or at least one pdsch-TimeDomainAllocationList). In some implementations, the pdsch-TimeDomainAllocationListNA may be configured by the BS on a BWP/PDSCH/serving cell/serving cell group basis.

In some implementations, whether a UE performs the HARQ feedback transmission may be dependent upon whether the resource allocation (e.g., in the time domain) of a PDSCH is determined by a predefined resource allocation table(s). The predefined resource allocation table(s) may be configured by the RRC layer or may be predefined in the PHY layer of the UE. In some implementations, the predefined resource allocation table(s) may be provided for the DL scheduling to show that the UE is not required to transmit the corresponding HARQ feedback(s).

In some implementations, whether a UE performs the HARQ feedback transmission may be dependent upon whether the value(s) of the parameter(s), such as S, L, and/or $K_0$, for the PDSCH is larger (or smaller) than a threshold. In some such implementations, the parameter S may be an index of the starting symbol of a scheduled Physical Downlink Shared Channel (PDSCH) in a slot, the parameter L may be the number of consecutive symbols of the PDSCH in the slot, the parameter $K_0$ may indicate a slot offset between a slot (e.g., slot 0 of subframe n illustrated in FIG. 1) containing a PDCCH (e.g., PDCCH 102 illustrated in FIG. 1) and a slot (e.g., slot 1 of subframe n illustrated in FIG. 1) containing a PDSCH (e.g., PDSCH 104 illustrated in FIG. 1) that is indicated/scheduled by the DCI carried by the PDCCH (e.g., PDCCH 102 illustrated in FIG. 1), and the parameter $K_1$ may indicate a slot offset between a slot (e.g., slot 1 of subframe n illustrated in FIG. 1) containing the PDSCH (e.g., PDSCH 104 illustrated in FIG. 1) and a slot (e.g., slot 1 of subframe n+1 illustrated in FIG. 1) that the UE is indicated to perform the HARQ feedback transmission. Thus, in some implementations, the parameter(s), such as S, L, and/or $K_0$ may be considered as an implicit indicator that indicates to the UE whether to perform the HARQ feedback transmission. In some implementations, the threshold may be predefined for the UE or may depend on the UE's implementation. In some implementations, the threshold may be configured by the BS on a UE/serving cell group/serving cell/BWP basis, for example, via a DL RRC message(s).

In some implementations, whether a UE performs the HARQ feedback transmission may be dependent upon whether the value(s) of the parameter(s), such as the S, L, and/or $K_0$ for the PDSCH matches a value (or a set of values). The value (or the set of values) may be predefined for the UE or may depend on the UE's implementation. In some implementations, the value (or the set of values) may be configured by the BS based a UE/serving cell group/serving cell/BWP basis, for example, via a DL RRC message(s).

In some implementations, when the CRC bits of the DCI is scrambled with a UE specific RNTI and the NDI field within the DCI is set to 0/1, it implies that the HARQ feedback (e.g., an ACK/NACK) is not needed to be transmitted for the PDSCH corresponding to the DCI. In some implementations, the UE-specific RNTI may be one of the UE-specific RNTIs configured to a UE.

In some implementations, whether a UE performs the HARQ feedback transmission may be dependent upon the content of at least one DCI field in the DCI. For example, the Network (NW)/BS may set a first DCI field in the DCI to a first value and/or set a second DCI field in the DCI to a second value. When the UE receives the DCI containing the first DCI field and the second DCI field, the UE may determine whether to enable/disable the corresponding HARQ feedback transmission by checking the values of the first DCI field and/or the second DCI field.

Case A2

In this case, the BS may implicitly indicate to the UE whether to perform a HARQ feedback transmission (e.g., for the dynamically-scheduled PDSCH reception(s)) via the UE-specific RNTI that scrambles the CRC bits of the DCI. In some implementations, the UE-specific RNTI may be configured by the BS via a DL RRC message.

For example, when the CRC bits of the DCI is scrambled with a Configured Scheduling-RNTI (CS-RNTI), a Modulation Coding Scheme-Cell-RNTI (MCS-C-RNTI)(which may be defined in the 3GPP TS 38.331), or an RNTI provided in the TS 38.213 and TS 38.331, the UE may not perform the corresponding HARQ feedback transmission.

For example, the CRC bits of the DCI may be scrambled with a CS-RNTI, a MCS-C-RNTI or an RNTI defined in the TS 38.213 and TS 38.331, and one or multiple field(s) contained in the DCI may explicitly indicate to the UE that all the PDSCH receptions for the activated SPS (via the DCI) do not need to perform the corresponding HARQ feedback transmission.

For example, when the CRC bits of the DCI is scrambled with an RNTI, the UE may not need to perform the corresponding HARQ feedback transmission. The RNTI may be applied to a DCI format (e.g., DCI format 1_0, DCI format 1_1, or DCI format 1_2) which is used for the PDSCH scheduling.

Case A3

In this case, the BS may implicitly indicate to the UE whether to perform a HARQ feedback transmission (e.g., for the dynamically-scheduled PDSCH reception(s)) via a specific DCI format.

For example, if the BS uses a DCI format 1_0/1_1 for DL scheduling, the UE may not perform the corresponding HARQ feedback transmission (e.g., after receiving the DCI format 1_0/1_1).

For example, if a DCI format other than any legacy DCI format is adopted by the BS for DL scheduling, the UE may not perform the corresponding HARQ feedback transmission after receiving the DCI format. In some implementations, the DCI format may be designed for enhancing the robustness and reliability of the DL scheduling. In some implementations, the DCI format may be designed for indicating to the UE whether the HARQ feedback transmission is needed.

Case A4

In this case, the BS may implicitly indicate to the UE whether to perform a HARQ feedback transmission for a PDSCH reception via the PDCCH that schedules the PDSCH reception.

For example, if the DCI that schedules the PDSCH reception is received on a UE specific search space or a common search space, the UE may not perform the corresponding HARQ feedback transmission.

In some implementations, if the DCI that schedules the PDSCH reception is decoded from a PDCCH that is indicated by a specific type of serving cell, the UE may not perform the corresponding HARQ feedback transmission. The specific type of serving cell may be (or include) a PCell, a PSCell, a Transmission Reception Point (TRP), a beam, or a cell that is configured for a certain type of service (e.g., Non-Terrestrial Network (NTN)).

In some implementations, if the DCI that schedules the PDSCH reception is decoded from a PDCCH indicated by a UE-specific/BWP-specific CORESET (e.g., corresponding to an IE denoted as ControResourceSet) configuration, the UE may not perform the corresponding HARQ feedback transmission. For example, if the DCI that schedules the PDSCH reception is decoded from a PDCCH indicated by a CORESET configuration indicated by the non-ack indication in the RRC layer, the UE may not perform the corresponding HARQ feedback transmission.

In some implementations, if the DCI that schedules the PDSCH reception is decoded from a PDCCH indicated by a UE-specific/BWP-specific search space (e.g., corresponding to an IE denoted as SearchSpace) configuration, the UE may not perform the corresponding HARQ feedback transmission. For example, if the DCI that schedules the PDSCH reception is decoded from a PDCCH indicated by a specific search space configuration (e.g., indicated by the non-ack indication) in the RRC layer, the UE may not perform the corresponding HARQ feedback transmission.

Case A5

In this case, the BS may implicitly indicate to the UE whether to perform a HARQ feedback transmission (e.g., for the dynamically-scheduled PDSCH reception(s)) via a PDSCH on which the DL data (e.g., a TB) is transmitted.

For example, when the PDSCH is on a specific BWP, the UE may not perform the corresponding HARQ feedback transmission. The specific BWP may be indicated by the BS via a BWP Identity (ID) or via an indicator contained in the BWP-Downlink IE, the BWP-DownlinkDedicated IE, the BWP-DownlinkCommon IE, the PDSCH-ConfigCommon IE, or the PDSCH-Config IE.

In some implementations, when the PDSCH is on a specific serving cell, the UE may not perform the corresponding HARQ feedback transmission. The specific serving cell may be indicated by the BS via a serving cell ID or via an indicator contained in the ServingCellConfigCommon IE, the ServingCellConfig IE, the PUSCH-ServingCellConfig IE or the PDSCH-ServingCellConfig IE. For example, the specific serving cell may be (or include) a PCell, a PSCell, a TRP, a beam, or a cell that is configured for a specific service (e.g., NTN).

In some implementations, when the PDSCH is on a specific serving cell group, the UE may not perform the corresponding HARQ feedback transmission. The specific serving cell group may be indicated by the BS via a serving cell group ID (e.g., the ID of an MCG or SCG) or via an indicator contained in the CellGroupConfig IE, the MAC-CellGroupConfig IE, or the PhysicalCellGroupConfig IE.

In some implementations, the PDSCH may be indicated by an RRC indication, non-ack.

In some implementations, the non-ack may be configured on a UE/serving cell group/serving cell/BWP/SPS configuration basis. For example, if a serving cell is indicated with the non-ack, each PDSCH reception corresponding to the serving cell may not need a corresponding HARQ feedback transmission. In another example, if an SPS configuration is indicated with the non-ack, each PDSCH reception corresponding to the SPS configuration may not need a corresponding HARQ feedback transmission.

In some implementations, the UE may be configured with a configuration that includes BWP ID(s) and/or serving cell ID(s). The UE may know that a PDSCH reception corresponding to the BWP ID(s) and/or serving cell ID(s) in the configuration may not need to a corresponding HARQ feedback transmission.

In some implementations, the PDSCH (or the PDCCH which schedules the PDSCH) may be within a specific resource (e.g., time and/or frequency) range. The specific resource range may be predefined or configured by the BS on a BWP/serving/serving cell group/UE basis, for example, via a DL RRC message. In some implementations, if the PDSCH is within the specific resource range, the UE may not perform a HARQ feedback transmission for the PDSCH reception. In some implementations, if the PDSCH is out of the specific resource range, the UE may not perform a HARQ feedback transmission for the PDSCH reception.

One or more parameters may be used for indicating the resource range. For example, a first parameter may be used to indicate the starting symbol/slot/subframe of the PDSCH (or the PDCCH which schedules the PDSCH), and a second parameter may be used to indicate the ending symbol/slot/subframe index of the PDSCH (or the PDCCH which schedules the PDSCH).

Case A6

In this case, the BS may implicitly indicate to the UE whether to perform a HARQ feedback transmission (e.g., for the dynamically-scheduled PDSCH reception(s)) via a specific radio resource pattern (e.g., the arrangement of UL symbol(s), DL symbol(s), and/or Flexible symbol(s) in the time domain).

For example, if the PDSCH is on a specific serving cell that is configured with a specific radio resource pattern, the UE may not perform the corresponding HARQ feedback transmission. In some implementations, the specific serving cell may be a DL-only cell on which only the DL transmission(s) may be allowed to be performed.

For example, if the PDSCH is in a specific subframe that is configured with a specific radio resource pattern, the UE may not perform the corresponding HARQ feedback transmission. In some implementations, all slots/symbols of the specific subframe are configured as DL slot(s)/DL symbol(s). For example, at least one new slot format (e.g., of which the slotFormatCombinationId is equal to or larger than a specific number, such as 62) that may, for example, provided in the 3GPP TS 38.213 may be used to indicate to the UE that the corresponding HARQ feedback transmission is not needed for the PDSCH reception. Under such a circumstance, if a PDSCH reception is on a BWP that is indicated with the new slot format, the UE may know that the corresponding HARQ feedback for the PDSCH reception is not needed to be transmitted.

In some implementations, a flexible format (e.g., which may be used as a DL format or an UL format, depending on the scheduling of the BS) may be configured as a DL format (e.g., via an RRC message), where the HARQ feedback(s) for the DL reception(s) with this DL format is not needed to be transmitted.

In some implementations, a list of slot formats may be preconfigured by the BS, or predefined at the UE (e.g., prestored in the UE without being informed by the BS/NW). If the BS indicates to the UE a slot format (e.g., of a BWP) in the list of slot formats (e.g., via the RRC signaling or the PHY signaling (e.g., Slot Format Indication-RNTI SFI-RNTI)), the UE may not perform the corresponding HARQ feedback transmission for the PDSCH reception.

In some implementations, if a PDSCH is in a slot having a specific radio resource pattern (e.g., a DL/UL/flexible symbol pattern), the UE may not perform the corresponding HARQ feedback transmission for the PDSCH.

In some implementations, all symbols in the specific subframe may be configured as DL symbols that are used for DL transmissions only. If the PDSCH is in the specific subframe, the UE may not perform the corresponding HARQ feedback transmission.

Case A7

In this case, a TB received on the PDSCH may have a specific format pattern/data structure. The UE may know whether to perform the corresponding HARQ feedback transmission for the PDSCH according to the format pattern/data structure of the TB.

For example, if the TB received on the PDSCH includes only a sub-PDU carrying a Service Data Unit (SDU) for a Data Radio Bearer (DRB) or for a Logical Channel (LCH)/Logical Channel Group (LCG)/LCH associated with a Radio Link Control (RLC) entity that is configured as Acknowledged Mode (AM)/Transparent Mode (TM)/Unacknowledged Mode (UM)/service flow, the UE may not perform the corresponding HARQ feedback transmission for the PDSCH on which the TB is received.

In some implementations, the MAC entity (e.g., of the UE) may determine whether to instruct the PHY layer (e.g., of the UE) to transmit the HARQ feedback (e.g., a HARQ-ACK) based on the MAC PDU content. For example, the determination of the MAC entity may be based on:
the Logical Channel Identifier (LCID) in the sub-header of the MAC sub-PDU; or
whether the MAC PDU contains a MAC sub-PDU with its sub-header containing an LCID having a specific value. For example, the specific value of the LCID may be a value corresponding to the MAC sub-PDU carrying the MAC Control Element (CE) or carrying the MAC SDU for the Common Control Channel (CCCH) or the LCH of a Signaling Radio Bearer (SRB).

Case A8

In this case, whether a UE should transmit a HARQ feedback for a PDSCH reception dynamically scheduled by the BS or for an SPS reception may be dependent upon an RRC configuration.

In some implementations, the RRC configuration may include the number of PDSCH repetitions. Specifically, when a PDSCH repetition scheme is applied, a UE may perform a PDSCH transmission repeatedly, where each PDSCH transmission performed by the UE based on the PDSCH repetition scheme may be a PDSCH repetition.

In some implementations, the RRC configuration may include a PDSCH aggregation factor (e.g., an IE denoted as pdsch-AggregationFactor) for the PDSCH.

In some implementations, when the number of PDSCH repetitions exceeds (or below) a threshold, the UE may not perform the corresponding HARQ feedback transmission for the PDSCH repetition(s). The threshold may be a predefined value, for example, addressed in the 3GPP TS, or may be preconfigured, for example, by the BS via a DL RRC message. In some implementations, the threshold may be configured by the BS on a serving cell group/serving cell/BWP/PDSCH basis. For example, if the threshold is configured by the BS on a serving cell group basis, the BS may configure a first serving cell group with a first threshold, and configure a second serving cell group with a second threshold, where the first threshold and the second threshold may be configured by the BS independently/individually. In another example, if the threshold is configured by the BS on a serving cell basis, the BS may configure a first serving cell with a first threshold, and configure a second serving cell with a second threshold, where the first threshold and the second threshold may be configured by the BS independently/individually.

In some implementations, the RRC configuration may include an IE/parameter (e.g., denoted as pdsch-AggregationFactorNA) that indicates the number of PDSCH repetitions. If a PDSCH is configured with the pdsch-AggregationFactorNA, the UE may not perform the corresponding HARQ feedback transmission.

Case A9

In this case, whether a UE should transmit a HARQ feedback for a PDSCH may be determined by a Skipping HARQ Feedback (SHF) function. For example, the HARQ feedback transmission may not be performed by the UE when the SHF function is turned ON (or activated). Conversely, the HARQ feedback transmission may be performed by the UE when the SHF function is turned OFF (or deactivated).

In some implementations, the ON/OFF state of the SHF function may be controlled by the BS or the UE.

In some implementations, the ON/OFF state of the SHF function may be switched in response to at least one of the following factors (c1) to (c7):
(c1) an RRC configuration;
(c2) a DL MAC CE;
(c3) a DL MAC CE that is identified by a MAC PDU sub-header with a specific LCID, where the DL MAC CE may have a fixed size of zero bits;
(c4) a specific DCI format;
(c5) a specific DCI field;
(c6) the UE finds that a specific field of the DCI is set to a specific value; and
(c7) the UE finds that the CRC bits of the DCI is scrambled by a specific RNTI (e.g., a UE-specific RNTI).

In some implementations, the SHF function may be configured by the BS based on a UE/serving cell group/serving cell/BWP/PDSCH. For example, if the SHF function is configured based on a BWP, whether a UE performs a corresponding HARQ feedback transmission for a PDSCH that is received on a first BWP may be determined by the SHF function configured for the first BWP; whether the UE performs a corresponding HARQ feedback transmission for a PDSCH that is received on a second BWP may be determined by the SHF function configured for the second BWP, and so on.

In some implementations, the initial state (e.g., an ON state or an OFF state) of the SHF function may be indicated by an RRC configuration that is used for configuring the SHF function.

In some implementations, after the SHF function is configured, the BS may further indicate to the UE to turn the SHF function ON/OFF, for example, via at least one MAC CE or the PHY layer signaling.

In some implementations, the ON/OFF state of the SHF function may be controlled by a timer. The initial value of the timer may be configured by the RRC signaling received from the BS. The time unit of the timer may be a frame/subframe/millisecond/sub-millisecond/slot/symbol.

In some implementations, the timer may be started or restarted when the SHF function is instructed to be turned ON (e.g., via Network (NW) signaling). When the timer expires, the UE may turn OFF the SHF function.

In some implementations, the timer may be started or restarted when the SHF function is instructed to be turned OFF (e.g., via NW signaling). When the timer is expired, the UE may turn ON the SHF function.

In some implementations, the timer may be started or restarted when a PDSCH is received with the corresponding NDI being toggled. When the timer expires, the UE may turn OFF the SHF function.

In some implementations, the timer may be started or restarted when the UE receives a BWP switching signaling from the NWBS. The BWP switching signaling may be an indication of switching the (active) BWP.

In some implementations, the timer may be started or restarted when a BWP is activated.

In some implementations, the timer may be started or restarted when an SCell is activated.

In some implementations, the timer may be started or restarted when a default BWP is activated.

In some implementations, the timer may be started or restarted when a non-default BWP is activated by a UE. Compared to a BWP indicated by a BS (e.g., a gNB) as a default BWP, the non-default BWP may be a DL BWP having a BWP ID that is different from the BWP ID of the default BWP.

In some implementations, the control method of the ON/OFF state of the SHF function may be indicated by the implementation introduced within the cases A1 to A8. For example, once the HARQ feedback is not needed for a PDSCH reception, as in the conditions described in the implementation(s) of cases A1 to A8, the SHF function may be turned OFF.

In some implementations, the ON/OFF state of the SHF function may be associated with a System Frame Number (SFN), a slot number, or an OFDM symbol number. Instead of explicitly indicating to a UE a HARQ process ID to inform the UE about which HARQ feedback is not needed for the HARQ process ID corresponding a PDSCH, associating a HARQ process with an SFN or a slot number may reduce the signaling overhead. For example, in a time slot, a HARQ process ID of which the associated SHF function is instructed to be turned OFF may be calculated by the UE according to the following expression:

Disabled HARQ Process ID=[floor(CURRENT_slot/ numberOfSlotsPerFrame)] modulo nrofHARQ- Processes where CURRENT_slot=[(SFN×numberOfSlotsPerFrame)+slot number in the frame] and numberOfSlotsPerFrame represents the number of consecutive slots per frame.

As a result, for a system frame with SFN #1, the SHF of HARQ #1 may be turned OFF, for SFN #2, the SHF of HARQ #2 is disabled, and so on and so forth.

Case A10

In this case, an independent MAC entity may be introduced. If a TB of a PDSCH is received/handled/processed by the independent MAC entity, the UE may not perform the corresponding HARQ feedback transmission for the PDSCH.

Case A11

In this case, when the length of a time alignment timer (e.g., corresponding to an IE denoted as TimeAlignmentTimer, for example, as provided by the 3GPP TS 38.331) is longer than, shorter than, or equal to a predefined/preconfigured value, the UE may determine not to transmit the corresponding HARQ feedback for a PDSCH reception corresponding to the time alignment timer.

Case A12

In this case, when the number of HARQ processes configured to be used on the PDSCH of a serving cell is larger than a predefined/preconfigured value, the HARQ feedback transmission of the PDSCH reception may not need to be performed by the UE.

Figure 4:
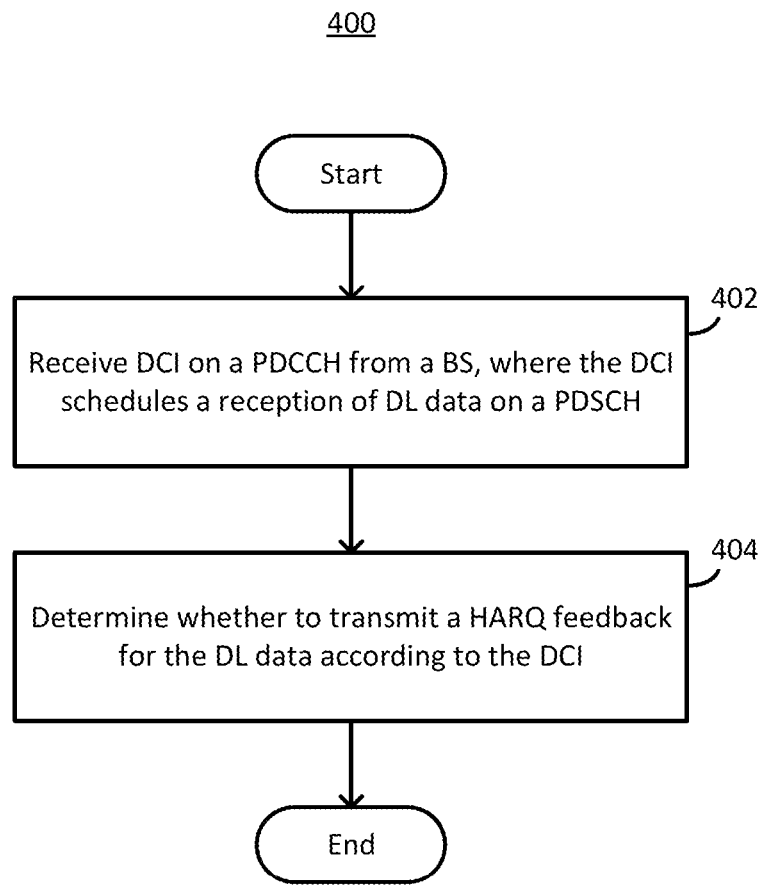
FIG. 4 illustrates a flowchart for a method/process, performed by a UE, for handling HARQ feedback transmissions, in accordance with an implementation of the present disclosure.

FIG. 4 illustrates a flowchart for a method/process 400, performed by a UE, for handling HARQ feedback transmissions, in accordance with an implementation of the present disclosure. The method 400 includes actions 402 and 404.

In action 402, a UE may receive the DCI on a PDCCH from a BS. The DCI may schedule/indicate a reception of DL data on a PDSCH. For example, the DL data may include one or more TBs from the PDSCH.

In action 404, the UE may determine whether to transmit a HARQ feedback for the DL data (or for the PDSCH where the DL data is received) according to the DCI. The determination may be based on the DCI-related criteria described with reference to Cases A1 to A12. For example, the determination of whether the HARQ feedback transmission is needed in action 404 may be based on an indicator included in the DCI, as illustrated in FIG. 5 and FIG. 6.

Figure 5:
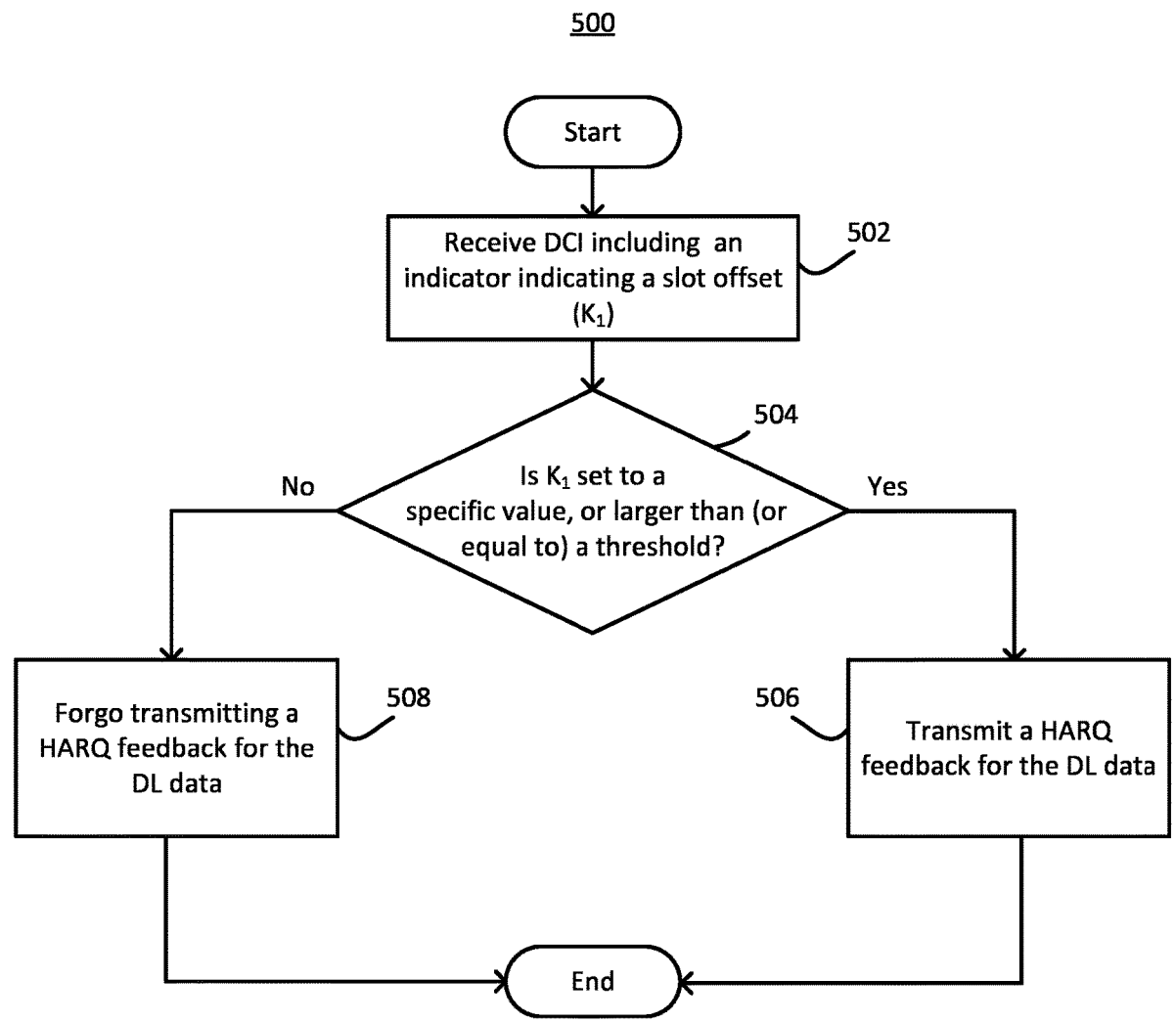
FIG. 5 illustrates a flowchart for a method/process for handling HARQ feedback transmissions, in accordance with an implementation of the present disclosure.
Figure 6:
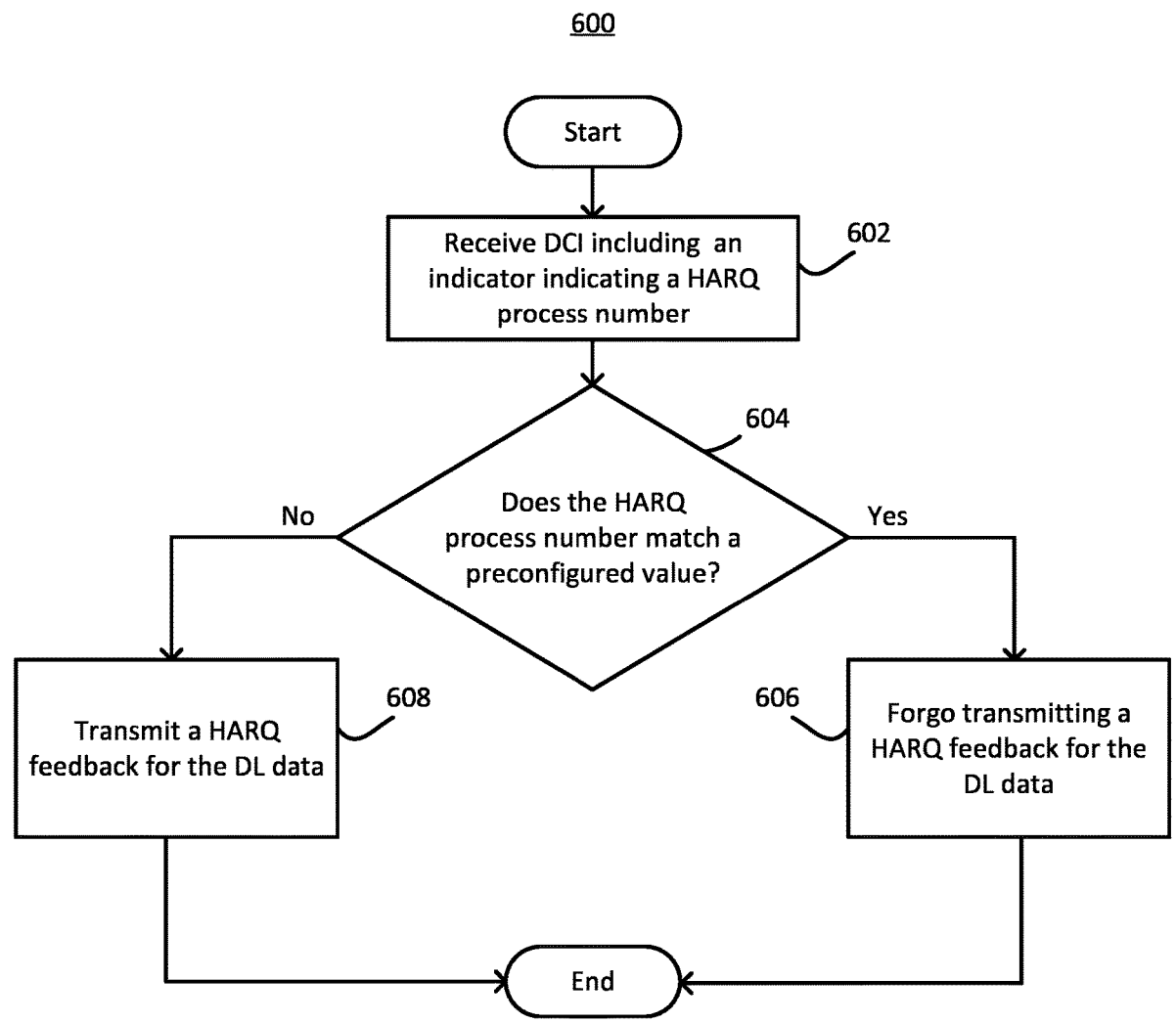
FIG. 6 illustrates a flowchart for a method/process for handling HARQ feedback transmissions, in accordance with an implementation of the present disclosure.

FIG. 5 illustrates a flowchart for a method/process 500 for handling HARQ feedback transmissions, in accordance with an implementation of the present disclosure. The method 500 includes actions 502, 504, 506, and 508.

In action 502, a UE may receive the DCI (e.g., for scheduling a PDSCH) that includes an indicator (e.g., the parameter $K_1$) indicating a slot offset between a first slot containing a PDSCH and a second slot that the UE is indicated by the BS to transmit a HARQ feedback for the DL data of the PDSCH on a UL resource configured by the BS.

After receiving the DCI, the UE may determine whether to transmit a HARQ feedback for the DL data of the PDSCH according to the slot offset indicated by the DCI. For example, the UE may transmit a HARQ feedback for the DL data when (or only when) the slot offset is set to an applicable value of slot offset (e.g., an applicable $K_1$ value).

As illustrated in FIG. 5, in action 504, the UE may determine whether the slot offset (e.g., a $K_1$ value) is set to a specific value, or is larger than (or equal to) a threshold.

In some implementations, the specific value may be an inapplicable $K_1$ value (e.g., a negative value, such as "−1"). In some implementations, the threshold may be set to discriminate the applicable $K_1$ value(s) and the inapplicable $K_1$ value(s). For example, the threshold may be set to "0". In this case, if the $K_1$ value indicated by the DCI is less than the threshold, the $K_1$ value may be considered as an inapplicable $K_1$ value because the UE may be unable to determine a resource location of a UL resource for a HARQ feedback transmission based on a negative value.

In action 506, when the UE determines that the slot offset (e.g., a $K_1$ value) is set to the specific value, or is larger than (or equal to) the threshold, the UE may transmit a HARQ feedback for the DL data of the PDSCH. For example, the UE may transmit the HARQ feedback for the DL data only when the slot offset (e.g., indicated by the indicator in the DCI) is not the specific value. For example, after comparing the slot offset (indicated by the indicator in the DCI) with the threshold, the UE may transmit the HARQ feedback for the DL data only when the slot offset is larger than or equal to the threshold.

In action 508, when the UE determines that the slot offset (e.g., a $K_1$ value) is not set to the specific value, or is larger than (or equal to) the threshold, the UE may forgo transmitting a HARQ feedback for the DL data of the PDSCH. For example, the UE may be disabled for transmitting the HARQ feedback.

FIG. 6 illustrates a flowchart for a method/process 600 for handling HARQ feedback transmissions, in accordance with an implementation of the present disclosure. The method 600 includes actions 602, 604, 606 and 608.

In action 602, a UE may receive the DCI (e.g., for scheduling a PDSCH) that includes an indicator indicating a HARQ process number. For example, the HARQ process number may be a HARQ process ID of a HARQ process.

After receiving the DCI, the UE may determine whether to transmit a HARQ feedback for the DL data of the PDSCH according to the HARQ process number indicated by the DCI. For example, the UE may transmit a HARQ feedback for the DL data when (or only when) the HARQ process number meets certain criteria.

As illustrated in action 604, the UE may determine whether the HARQ process number matches a preconfigured value.

When the UE determines that the HARQ process number matches the preconfigured value, in action 606, the UE may forgo transmitting a HARQ feedback for the DL data of the PDSCH.

When (or only when) the UE determines that the HARQ process number does not match the preconfigured value (e.g., the HARQ process number does not match the preconfigure value), in action 608, the UE may transmit a HARQ feedback for the DL data of the PDSCH.

In some implementations, the UE may receive the preconfigured value in a DL RRC message from the BS.

In some implementations, the UE may determine whether to transmit the HARQ feedback for the PDSCH according to whether the HARQ process number is within a specific range configured by the BS. The UE may transmit the HARQ feedback for the DL data when (or only when) the HARQ process number is within (or out of) the specific range.

In some implementations, the specific range may be determined by the RRC configuration(s) received from the BS. For example, the UE may receive an RRC configuration including a first value (e.g., the value of the IE nrofHARQ-Processes) indicating the number of HARQ processes to be used for the reception of the DL data and a second value (e.g., the value of the IE nrofHARQ-ProcessesForNA) indicating how many of these HARQ processes do not need to have a corresponding HARQ feedback transmission. The UE may determine the specific range according to a combination of the first value and the second value. For example, the UE may determine the specific range based on the first value only, the second value only, or both the first value and the second value. One or more examples of the combination of the first value and the second value may be found in Case A1. For example, the specific range may start from the value of (nrofHARQ-Processes+1) and end at the value of (nrofHARQ-Processes+nrofHARQ-ProcessesForNA). For example, the specific range may be [0 to (nrofHARQ-Processes-nrofHARQ-ProcessesForNA+1)]. As another example, the specific range may be [0 to (nrofHARQ-ProcessesForNA−1)]. As yet another example, the specific range may be [(nrofHARQ-ProcessesForNA+1) to nrofHARQ-Processes].

Section B—Evolved DL Process Modelling

In this section, methods of some implementations regarding how a UE determines whether to transmit a HARQ feedback for the DL data (from a PDSCH reception) are provided.

Figure 7:
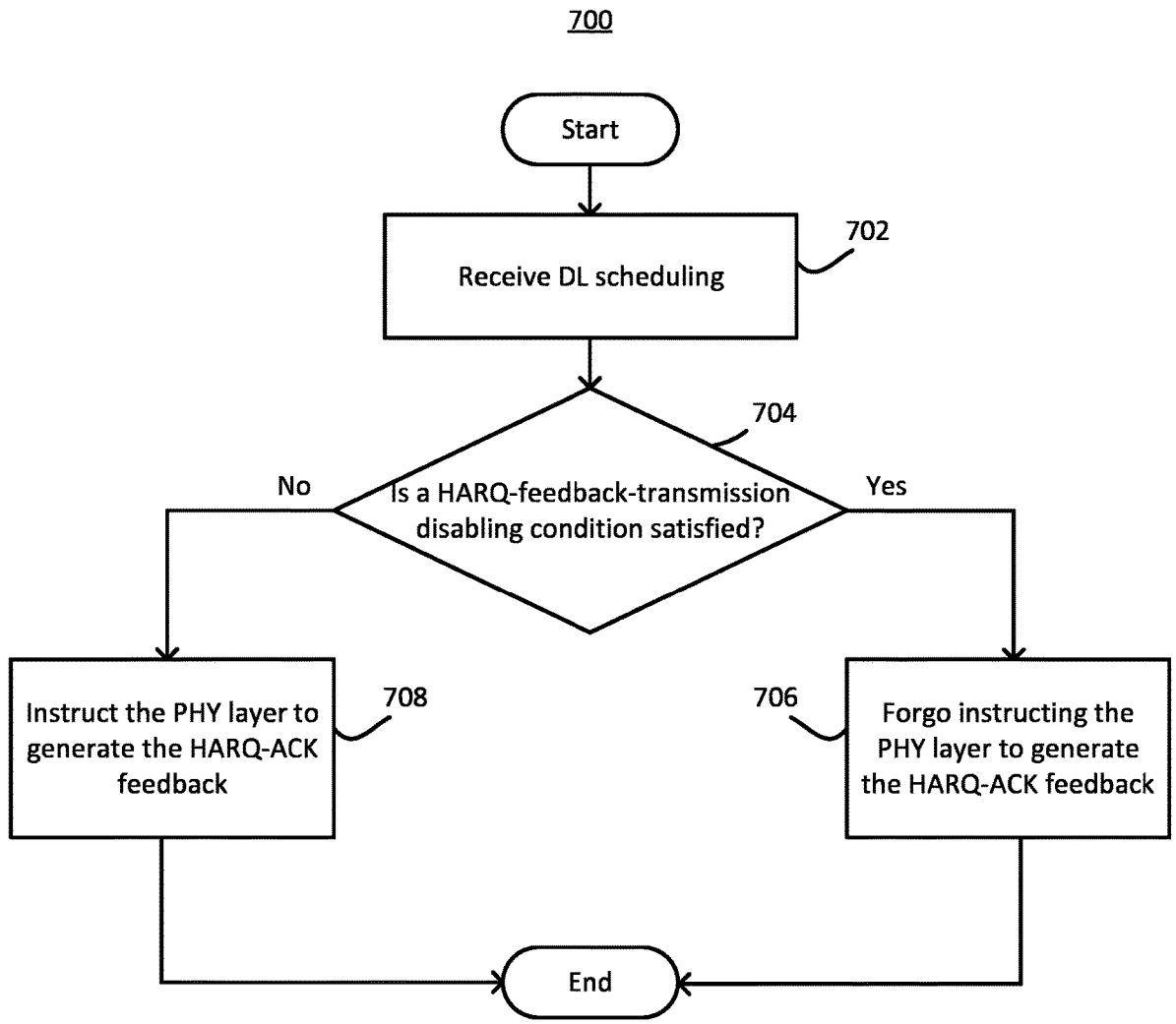
FIG. 7 illustrates a flowchart of for a method/process for handling HARQ feedback transmissions, in accordance with an implementation of the present disclosure.

FIG. 7 illustrates a flowchart of for a method/process 700 for handling HARQ feedback transmissions, in accordance with an implementation of the present disclosure. The method 700 includes actions 702, 704, 706 and 708.

In action 702, a UE may receive DL scheduling from a BS (e.g., via the DCI that schedules/indicates a PDSCH reception).

In action 704, the UE may determine whether a HARQ-feedback-transmission disabling criterion is satisfied. In some implementations, the HARQ-feedback-transmission disabling criterion may be any of the conditions that may disable the UE from performing the corresponding HARQ feedback transmission for the DL data (or PDSCH), such as the UE indicated by an inapplicable $K_1$ value, the UE indicated by a specific HARQ process number, and any other disabling conditions described in various cases in the present disclosure.

If the UE determines that the HARQ-feedback-transmission disabling criterion is satisfied (e.g., the HARQ-feedback-transmission disabling condition is satisfied), in action 706, the UE's MAC entity may forgo instructing the PHY layer (of the UE) to perform the HARQ feedback transmission, and thus the HARQ feedback for the PDSCH reception may not be generated and transmitted by the UE.

In contrast, if the UE determines that the HARQ-feedback-transmission disabling criterion is not satisfied (e.g., the HARQ-feedback-transmission disabling condition is not satisfied), in action 708, the UE's MAC entity may instruct the PHY layer (of the UE) to perform the HARQ feedback transmission.

In the following cases, the DL process at the UE side (e.g., the DL process illustrated in FIG. 3) may be modified based on the method(s) for handling HARQ feedback transmissions, as described in the present disclosure.

Case B1

In this case, the determination of whether a HARQ-feedback-transmission disabling condition is satisfied (e.g., action 704 illustrated in FIG. 7) may be made at Step 11 of FIG. 3 (e.g., action 326 illustrated in FIG. 3) or Step 11' (e.g., action 328 illustrated in FIG. 3) of the DL process. For example, after the PHY layer (of the UE) decodes the received data and provides the decoded result to the MAC entity, irrespective of whether the data is successfully decoded or not, the UE may check whether any of the HARQ-feedback-transmission disabling conditions are satisfied. If the UE finds that the HARQ-feedback-transmission disabling condition is satisfied, the UE's MAC entity may not instruct the PHY layer to perform HARQ feedback. In contrast, if no HARQ-feedback-transmission disabling condition is satisfied, the UE's MAC entity may instruct the PHY layer to perform the HARQ feedback transmission.

In some implementations, a HARQ process (or a "non-ACK HARQ process") is provided.

During the HARQ process, the UE's MAC entity may not instruct the PHY layer to perform HARQ feedback transmission(s) when a certain condition(s) (e.g., the HARQ-feedback-transmission disabling condition(s)) is satisfied.

An example of the TP of a (non-ACK) HARQ process is provided in Table B1 below.

TABLE B1

5.3.2.2 HARQ process

```
           The MAC entity then shall:
1>  if this is a new transmission:
    2>  attempt to decode the received data.
1>  else if this is a retransmission:
    2>  if the data for this TB has not yet been successfully decoded:
        3>  instruct the physical layer to combine the received data with the data currently in the soft buffer
            for this TB and attempt to decode the combined data.
1>  if the data which the MAC entity attempted to decode was successfully decoded for this TB; or
1>  if the data for this TB was successfully decoded before:
    2>  if the HARQ process is equal to the broadcast process:
        3>  deliver the decoded MAC PDU to upper layers.
    2>  else if this is the first successful decoding of the data for this TB:
        3>  deliver the decoded MAC PDU to the disassembly and demultiplexing entity.
1>  else:
    2>  instruct the physical layer to replace the data in the soft buffer for this TB with the data which the
        MAC entity attempted to decode.
1>  if the HARQ process is associated with a transmission indicated with a Temporary C-RNTI and the
    Contention Resolution is not yet successful; or
1>  if the HARQ process is equal to the broadcast process;
1>  if the timeAlignmentTimer, associated with the TAG containing the Serving Cell on which the HARQ
    feedback is to be transmitted, is stopped or expired;
1>  if one or multiple condition list within present disclosure is satisfied;
1>  if the HARQ process is equal to the non-ACK process;
1>  if the data for this TB was scheduled by the PDCCH indicated by a non-ack as defined in higher layer or
    notified by lower layer;
1>  if the data for this TB was scheduled by a PDCCH on a BWP/serving cell indicated by a non-ack as
    defined in higher layer or notified by lower layer;
1>  if the data for this TB was received on the PDSCH indicated by a non-ack as defined in higher layer or
    notified by lower layer; or
1>  if the data for this TB was received on the PDSCH on a BWP/serving cell indicated by a non-ack as
    defined in higher layer or notified by lower layer;
    2>  not instruct the physical layer to generate acknowledgement(s) of the data in this TB.
1>  else:
    2>  instruct the physical layer to generate acknowledgement(s) of the data in this TB.
```

In some implementations, the (non-ACK) HARQ process described in Table B1 above may be implemented according to Section A.

Case B2

In this case, the determination of whether a HARQ-feedback-transmission disabling condition is satisfied (e.g., action 704 illustrated in FIG. 7) may be made at Step 6 of FIG. 3 (e.g., action 312 illustrated in FIG. 3) of the DL process (e.g., between actions 310 and 314 illustrated in FIG. 3). For example, before the UE's MAC entity allocates the TB and the HARQ information (e.g., including a HARQ process ID) to a HARQ process indicated by the HARQ information, the MAC entity may determine whether one or multiple HARQ-feedback-transmission disabling conditions are satisfied. If yes, the UE's MAC entity may allocate the received TB to a non-ACK HARQ process during which the UE's PHY layer may not be instructed to perform the HARQ feedback transmission(s).

An example of the TP of the operation of the UE's MAC's entity is provided below in Table B2.

TABLE B2

5.3.2.1 HARQ Entity

```
          The MAC entity shall:
1>  if a downlink assignment has been indicated:
    2>  allocate the TB(s) received from the physical layer and the associated HARQ information to the
        HARQ process indicated by the associated HARQ information.
1>  if a downlink assignment has been indicated for the broadcast HARQ process:
    2>  allocate the received TB to the broadcast HARQ process.
1>  if one or multiple condition list within present disclosure is satisfied;
1>  if a downlink assignment has been indicated for the non-ACK process HARQ process;
1>  if a downlink assignment was scheduled by the PDCCH indicated by a non-ack as defined in higher
    layer or notified by lower layer;
1>  if a downlink assignment was scheduled by a PDCCH on a BWP/serving cell indicated by a non-ack as
    defined in higher layer or notified by lower layer;
1>  if a downlink assignment corresponding data was received on the PDSCH indicated by a non-ack as
    defined in higher layer or notified by lower layer; or
1>  if a downlink assignment corresponding data was received on the PDSCH on a BWP/serving cell
    indicated by a non-ack as defined in higher layer or notified by lower layer:
    2>  allocate the received TB to the non-ACK HARQ process.
```

In some implementations, the (non-ACK) HARQ process described in Table B2 may be implemented according to Section A.

Case B3

In this case, the determination of whether a HARQ-feedback-transmission disabling condition is satisfied (e.g., action 704 illustrated in FIG. 7) may be made at Step 3 of FIG. 3 (e.g., action 306 illustrated in FIG. 3) and Step 4 (e.g., action 308 illustrated in FIG. 3) of the DL process (e.g., between actions 310 and 314 illustrated in FIG. 3). For example, after the UE's MAC entity is indicated by the PHY layer for the reception of the DL assignment, the MAC entity may be indicated by the PHY layer that the DL assignment is indicated with a non-ack by the BS. The MAC entity may then allocate the received TB to the non-ACK HARQ process.

An example of the TP of the DL assignment reception is provided below in the Table B3-1.

TABLE B3-1

5.3.1 DL Assignment reception

Downlink assignments received on the PDCCH both indicate that there is a transmission on a DL-SCH for a particular MAC entity and provide the relevant HARQ information.
When the MAC entity has a C-RNTI, Temporary C-RNTI, or CS-RNTI, the MAC entity shall for each PDCCH occasion during which it monitors PDCCH and for each Serving Cell:
1> if a downlink assignment for this PDCCH occasion and this Serving Cell has been received on the PDCCH for the MAC entity's C-RNTI, specific RNTI or Temporary C-RNTI:
  2> if the downlink assignment is for the MAC entity's C-RNTI, and if the previous downlink assignment indicated to the HARQ entity of the same HARQ process was either a downlink assignment received for the MAC entity's CS-RNTI or a configured downlink assignment:
    3> consider the NDI to have been toggled regardless of the value of the NDI.
  2> if one or multiple condition list within present disclosure is satisfied;
  2> if the downlink assignment has been indicated for the non-ACK process HARQ process;
  2> if the downlink assigmnent was scheduled by the PDCCH indicated by a non-ack as defined in higher layer or notified by lower layer;
  2> if the downlink assignment was scheduled by a PDCCH on a BWP/serving cell indicated by a non-ack as defined in higher layer or notified by lower layer;
  2> if the downlink assignment corresponding data was received on the PDSCH indicated by a non-ack as defined in higher layer or notified by lower layer; or
  2> if the downlink assignment corresponding data was received on the PDSCH on a BWP/serving cell indicated by a non-ack as defined in higher layer or notified by lower layer:
    3> indicate the presence of the dow nlink assignment is a non-ACK type downlink assignment and deliver the associated HARQ information ot the HARQ entity.
  2> else
    3>indicate the presence of a downlink assignment and deliver the associated HARQ information to the HARQ entity.

Another example of the TP of the DL assignment reception is provided in Table B3-2 below.

TABLE B3-2

5.3.1 DL Assignment reception

When the MAC entity monitoring PDCCH, the MAC entity may, based on the scheduling information from lower layer and/or some indication from higher layer (e.g., RRC):
1> if a downlink assignment for this PDCCH occasion has been received on the PDCCH for the SI-RNTI;
  2> indicate a downlink assignment and redundancy version for the dedicated broadcast HARQ process to the HARQ entity.
1> if one or multiple condition list within present disclosure is satisfied;
1> if a downlink assignment for this PDCCH occasion has been received on the PDCCH for the specific RNTI (as introduced in the Chapter A);
1> if a downlink assignment has been indicated for the non-ACK process HARQ process;
1> if a downlink assignment was scheduled by the PDCCH indicated by a non-ack as defined in higher layer or notified by lower layer;
1> if a downlink assignment was scheduled by a PDCCH on a BWP/serving cell indicated by a non-ack as defined in higher layer or notified by lower layer;
1> if a downlink assignment corresponding data was received on the PDSCH indicated by a non-ack as defined in higher layer or notified by lower layer; or
1> if a downlink assignment corresponding data was received on the PDSCH on a BWP/serving cell indicated by a non-ack as defined in higher layer or notified by lower layer:
  2> indicate the downlink assignment and redundancy version for the non-ACK HARQ process to the HARQ entity;

Another example of the TP of the DL assignment reception is provided below in Table B3-3. As shown in Table B3-3, when the HARQ-feedback-transmission disabling condition is satisfied, the UE's MAC entity may allocate the corresponding DL assignment to be handled by broadcasting the HARQ process to the HARQ entity.

TABLE B3-3

TP of TS 38.321
5.3.1 DL Assignment reception

When the MAC entity monitoring PDCCH, the MAC entity may, based on the scheduling information from lower layer and/or some indication from higher layer (e.g., RRC):
1> if a downlink assignment for this PDCCH occasion has been received on the PDCCH for the SI-RNTI;
1> if one or multiple condition list within present disclosure is satisfied;
1> if a downlink assignment for this PDCCH occasion has been received on the PDCCH for the specific RNTI (as introduced in the Chapter A);
1> if a downlink assignment has been indicated for the non-ACK process HARQ process;
1> if a downlink assignment was scheduled by the PDCCH indicated by a non-ack as defined in higher layer or notified by lower layer;
1> if a downlink assignment was scheduled by a PDCCH on a BWP/serving cell indicated by a non-ack as defined in higher layer or notified by lower layer;
1> if a downlink assignment corresponding data was received on the PDSCH indicated by a non-ack as defined in higher layer or notified by lower layer; or
1> if a downlink assignment corresponding data was received on the PDSCH on a BWP/serving cell indicated by a non-ack as defined in higher layer or notified by lower layer:
 2> indicate a downlink assignment and redundancy version for the dedicated broadcast HARQ process to the HARQ entity.

In some implementations, the operations of communicating the HARQ feedback indication and the instruction between the MAC entity and the PHY layer may be applied to sidelink communications (e.g., vehicle-to-everything (V2X) communications). In this situation, the PDSCH and the PDCCH, as described in the present disclosure, may be replaced by a sidelink data channel and a sidelink control channel, respectively.

In some implementations, the UE's MAC entity may perform at least one of the following actions (d1) to (d3) when the UE determines not to transmit the HARQ feedback for the PDSCH:
 (d1) informing the PHY layer of the UE that the corresponding soft buffer is not needed;
 (d2) informing the PHY layer of the UE that the corresponding HARQ feedback transmission is not needed to be performed (e.g., by instructing the PHY layer of the UE to perform a HARQ process (e.g., a non-ACK HARQ process) in which the PHY layer may skip the transmission of HARQ feedback for the PDSCH); and
 (d3) instructing the PHY layer to flush a soft buffer corresponding to a HARQ process for the PDSCH.

In some implementations, the methods of handling HARQ feedback transmission provided in the present disclosure may be performed when at least one of the following conditions (e1) to (e2) is satisfied:
 (e1) the UE is configured with specific AS layer function;
 (e2) the UE is configured, for example, through an RRC connection, with two different radio access technology, such as gNB and eNB.

In some implementations, a DL RRC message may be an RRC Reconfiguration message (e.g., corresponding to the IE denoted as RRCReconfiguration), an RRC Resume message (e.g., corresponding to the IE denoted as RRCResume), an RRC Reestablishment message (e.g., corresponding to the IE denoted as RRCReestablishment), an RRC setup message (e.g., corresponding to the IE denoted as RRCSetup), or a DL unicast RRC message.

In some implementations, a BS may provide a configuration on a cell group basis, for example, by including such a configuration in an IE denoted as CellGroupConfig, an IE denoted as a MAC-CellGroupConfig, or an IE denoted as PhysicalCellGroupConfig.

In some implementations, a BS may provide a configuration on a serving cell basis by including the configuration in an IE denoted as ServingCellConfigCommon, an IE denoted as a ServingCellConfig, an IE denoted as PUSCH-ServingCellConfig, or an IE denoted as PDSCH-ServingCellConfig.

In some implementations, a BS may provide a configuration on a UL BWP basis by including the configuration in an IE denoted as BWP-Uplink, an IE denoted as a BWP-UplinkDedicated, an IE denoted as BWP-UplinkCommon, an IE denoted as PUSCH-ConfigCommon, or an IE denoted as PUSCH-Config.

In some implementations, a BS may provide a configuration on an DL BWP basis by including the configuration in an IE denoted as BWP Downlink, an IE denoted as a BWP-DownlinkDedicated, an IE denoted as BWP-DownlinkCommon, an IE denoted as PDSCH-ConfigCommon, or an IE denoted as PDSCH-Config.

In some implementations, a beam may be considered as a spatial domain filter. For example, a wireless device (e.g., a UE) may apply the spatial filter in an analog domain by adjusting the phase and/or amplitude of a signal before transmitting the signal through a corresponding antenna element. In another example, the spatial filter may be applied in a digital domain by Multi-Input Multi-Output (MIMO) techniques in the wireless communication system. For example, a UE may perform a PUSCH transmission by using a beam (e.g., a spatial/digital domain filter). In some implementations, a beam may be represented by (or correspond to) an antenna, an antenna port, an antenna element, a group of antennas, a group of antenna ports, or a group of antenna elements. In some implementations, a beam may be formed by (or associated with) a specific Reference Signal (RS) resource. The beam may be equivalent to a spatial domain filter through which the Electromagnetic (EM) waves are radiated.

In some implementations, signaling being transmitted may indicate that the MAC CE/MAC PDU/layer 1 signaling/higher layer signaling that contains (or corresponds to) the signaling is starting to be transmitted, completely transmitted, or has already delivered to the corresponding HARQ process/buffer for transmission. In some implementations, signaling being transmitted may indicate that the UE receives the corresponding HARQ feedback of the MAC PDU that includes the MAC CE/layer 1 signaling/higher layer signaling that contains (or corresponds to) the signaling. In some implementations, signaling being transmitted may indicate that the MAC CE/MAC PDU corresponding to the signaling is built or generated.

In some implementations, a PDSCH/PUSCH transmission may span multiple symbols in the time domain, where the duration of a PDSCH/PUSCH (transmission/occasion) may be the time interval that starts from the beginning of the first symbol of the PDSCH/PUSCH and ends at the end of the last symbol of the PDSCH/PUSCH.

In some implementations, the terms "interrupt," "stop," "cancel," and "skip" may be interchangeable.

In some implementations, if a UE does not need to perform the corresponding HARQ feedback transmission for the DL data/PDSCH, the UE's HARQ entity (or the HARQ process therein) may not perform the corresponding HARQ feedback transmission.

In some implementations, the PHY layer signaling may be implemented via at least one of the following items (f1) to (f4):

(f1) a DCI format;
(f1) a DCI field;
(f1) a DCI field being set to a specific value; and
(f1) the DCI with CRC bits scrambled by a specific RNTI.

In some implementations, a timer may be configured by an RRC configuration received from the BS. The UE may be configured with an initial value of the timer and the unit of the value (e.g., a frame/sub-frame/millisecond/sub-millisecond/slot/symbol). The timer may be started or restarted by the UE (e.g., the UE's MAC entity). For example, the timer may be started or restarted by the UE when a certain condition(s) is satisfied.

The following paragraphs provide non-limiting descriptions of certain terms used/included in some implementations of the present disclosure.

Cell: in some implementations, a cell (e.g., a PCell or an SCell) may be a radio network object that may be uniquely identified by a UE through the corresponding identification information, which may be broadcast by a UTRAN access point in a geographical area. A cell may be operated in a Frequency Division Duplex (FDD) or a Time Division Duplex (TDD) mode.

Serving Cell: in some implementations, for a UE operating in the RRC_CONNECTED state and not configured with CA/Dual Connectivity (DC), the UE may be configured with only one serving cell (e.g., the primary cell). For a UE operating in the RRC_CONNECTED state and configured with CA/DC, the UE may be configured with multiple serving cells including an SpCell and one or more SCells.

Carrier Aggregation (CA): in CA, two or more Component Carriers (CCs) may be aggregated. A UE may simultaneously receive or transmit signals on one or more of the CCs depending on its capabilities. CA may be supported with both the contiguous and non-contiguous CCs. When CA is applied, the frame timing and the SFN may be aligned across cells that are aggregated. In some implementations, the maximum number of configured CCs for a UE may be 16 for DL and 16 for UL. When CA is configured, the UE may have only one RRC connection with the network. During the RRC connection establishment/re-establishment/handover, one serving cell may provide the Non-Access Stratum (NAS) mobility information, and at RRC connection re-establishment/handover, one serving cell may provide the security input, where the serving cell may be referred to as the PCell. Depending on UE capabilities, SCells may be configured to form together with the PCell as a set of serving cells for the UE. The configured set of serving cells for a UE therefore always consists of one PCell and one or more SCells.

Configured Grant (CG): in some implementations, for CG Type 1, the RRC entity may directly provide the configured uplink grant (including the periodicity). For CG Type 2, the RRC entity may define the periodicity of the PUSCH resources of the CG, while the PDCCH addressed to the CS-RNTI may either signal and activate the configured uplink grant or deactivate it. That is, the PDCCH addressed to the CS-RNTI may indicate that the configured uplink grant can be reused according to the periodicity defined by the RRC entity, until the configured unlink grant is deactivated. When a configured uplink grant is active, a UL transmission according to the configured uplink grant may be performed if the UE cannot find its C-RNTI/CS-RNTI/MCS-C-RNTI on the PDCCH(s). If the UE receives its C-RNTI/CS-RNTI/MCS-C-RNTI on the PDCCH(s), the PDCCH allocation may override the configured uplink grant. The usage of MCS-C-RNTI may be equivalent to that of C-RNTI in the MAC procedures (except for the C-RNTI MAC CE).

HARQ: in some implementations, a HARQ process may be used to ensure the transmissions between two or more peer entities at Layer 1 (e.g., PHY layer). A single HARQ process may support a TB when the PHY layer is not configured for DL/UL spatial multiplexing. When the PHY layer is configured for the DL/UL spatial multiplexing, a single HARQ process may support one or multiple TBs. Each serving cell may correspond to a HARQ entity, where each HARQ entity may support a parallel processing of the DL and UL HARQ processes.

HARQ-ACK: in some implementations, a HARQ-ACK may include a 1-bit indicator, where the HARQ-ACK may be a NACK when the bit value of the indicator is set to a first value (e.g., "0") and may be a positive Acknowledgement (ACK) when the bit value of the indicator is set to a second value (e.g., "1").

Timer: in some implementations, the MAC entity of the UE may setup one or more timers for individual purposes, such as triggering uplink signaling retransmissions or limiting uplink signaling retransmission periods. When a timer (e.g., the timers described in various implementations of the present application) maintained by the MAC entity starts, the timer may start running until it stops or expires. In addition, the timer may not run when it does not start. A timer may start when it is not running. Also, a timer may restart when it is running. In some implementations, a timer may always start or restart from an initial value, where the initial value can be, but is not limited to, configured by the gNB via DL RRC signaling.

BWP: in some implementations, a BWP may be a subset of the total cell bandwidth of a cell. By configuring one or more BWPs to the UE and informing the UE that which of the configured BWPs is the currently the active BWP, Bandwidth Adaptation (BA) may be achieved. To enable the BA mechanism on the PCell, the gNB may configure the UE with one or more UL and DL BWPs. In case of CA, to enable the BA mechanism on S Cells, the gNB may configure the UE with one or more DL BWPs at least (which means that there may be no UL BWPs configure to the UE). For the PCell, the initial BWP may be the BWP used for initial access. For the SCell(s), the initial BWP may be the BWP configured for the UE to first operate during the SCell activation process. In some implementations, the UE may be configured with a First-Active UL BWP by a firstActiveUplinkBWP IE field. If the First-Active UL BWP is configured for an SpCell, the firstActiveUplinkBWP IE field may contain the ID of the UL BWP to be activated when the RRC (re)configuration is performed. If the field is absent, the RRC (re)configuration may not trigger a BWP switch. If the First-Active uplink BWP is configured for an SCell, the firstActiveUplinkBWP IE field may contain the ID of the UL BWP to be used upon the MAC-activation of an SCell.

PDCCH: in some implementations, the gNB may dynamically allocate resources to the UE via a C-RNTI/MCS-C-RNTI/CS-RNTI on one or more PDCCHs. The UE may always monitor the PDCCH(s) in order to find possible assignments when its DL reception is enabled (e.g., activity governed by Discontinuous Reception (DRX) when configured). In some implementations, when CA is configured, the same C-RNTI may be applied to all serving cells.

PDSCH/PUSCH: in some implementations, a PDCCH may be used to schedule the DL transmissions on a PDSCH and the UL transmissions on a PUSCH.

Time Alignment Timer: in some implementations, the RRC layer may configure the initial value of a timer (e.g., a time alignment timer, corresponding to the IE "timeAlignmentTimer"). The timer may be used for the maintenance of UL time alignment. In some implementations, the timer (e.g., time alignment timer) may be maintained based on a timing advance group basis. In addition, the timer may be used to control how long the UE's MAC entity considers that the serving cell(s) belonging to the associated TAG is UL time aligned.

Figure 8:
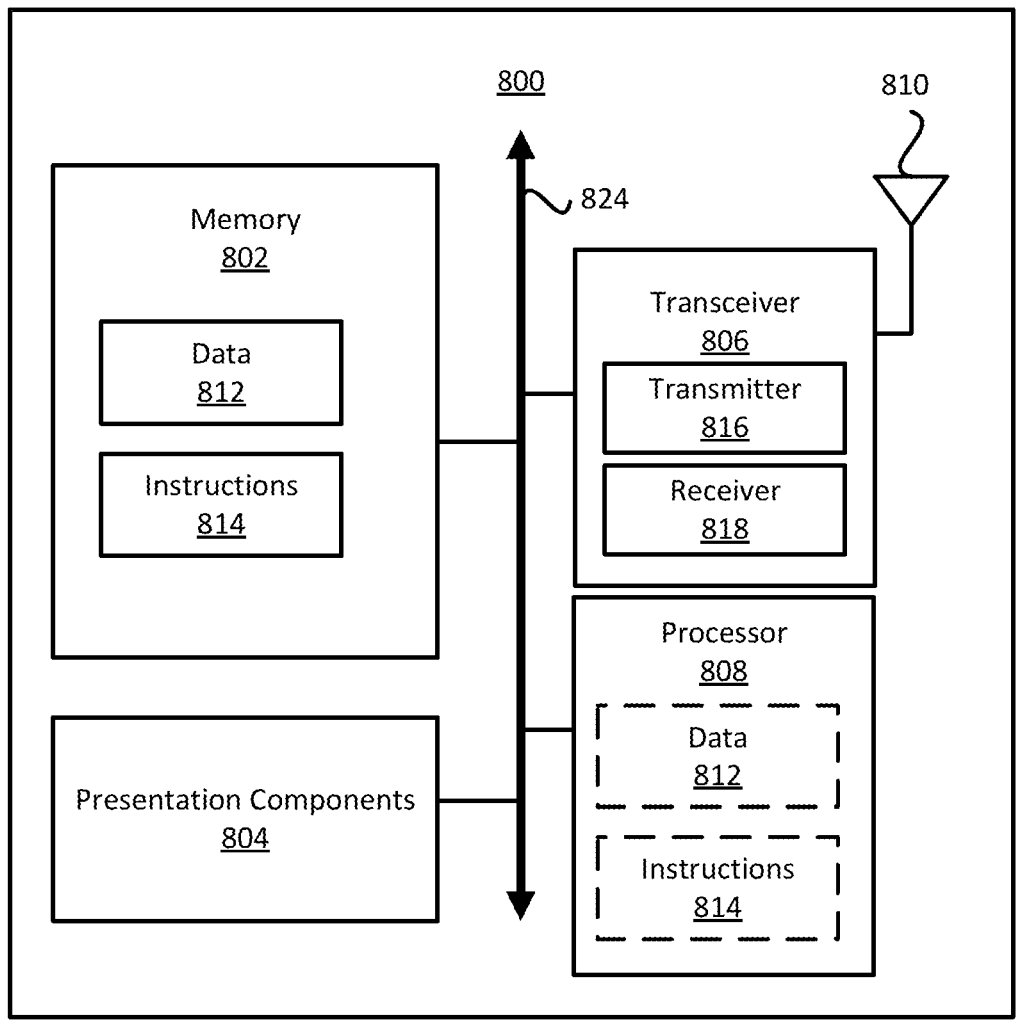
FIG. 8 illustrates a block diagram of a node for wireless communication, in accordance with an implementation of the present disclosure.

FIG. 8 illustrates a block diagram of a node for wireless communication, in accordance with various aspects of the present disclosure. As shown in FIG. 8, a node 800 may include a transceiver 806, a processor 808, a memory 802, one or more presentation components 804, and at least one antenna 810. The node 800 may also include an RF spectrum band module, a BS communications module, a network communications module, and a system communications management module, Input/Output (I/O) ports, I/O components, and power supply (not explicitly shown in FIG. 8). Each of these components may be in communication with each other, directly or indirectly, over one or more buses 824. In some implementations, the node 800 may be a UE or a BS that performs various functions described herein, for example, with reference to FIGS. 1 through 7.

The transceiver 806 having a transmitter 816 (e.g., transmitting/transmission circuitry) and a receiver 818 (e.g., receiving/reception circuitry) may be configured to transmit and/or receive time and/or frequency resource partitioning information. In some implementations, the transceiver 806 may be configured to transmit in different types of subframes and slots including, but not limited to, usable, non-usable and flexibly usable subframes and slot formats. The transceiver 806 may be configured to receive data and control channels.

The node 800 may include a variety of computer-readable media. Computer-readable media can be any available media that can be accessed by the node 800 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, Radio Frequency (RF), infrared and other wireless media. Combinations of any of the above should also be included within the scope of computer-readable media.

The memory 802 may include computer-storage media in the form of volatile and/or non-volatile memory. The memory 802 may be removable, non-removable, or a combination thereof. For example, the memory 802 may include solid-state memory, hard drives, optical-disc drives, etc. As illustrated in FIG. 8, the memory 802 may store computer-readable and/or-executable instructions 814 (e.g., software codes) that are configured to, when executed, cause the processor 808 to perform various functions described herein, for example, with reference to FIGS. 1 through 7. Alternatively, the instructions 814 may not be directly executable by the processor 808 but may be configured to cause the node 800 (e.g., when compiled and executed) to perform various functions described herein.

The processor 808 (e.g., having processing circuitry) may include an intelligent hardware device, a Central Processing Unit (CPU), a microcontroller, an ASIC, etc. The processor 808 may include memory. The processor 808 may process the data 812 and the instructions 814 received from the memory 802, and information through the transceiver 806, the base band communications module, and/or the network communications module. The processor 808 may also process information to be sent to the transceiver 806 for transmission through the antenna 810, to the network communications module for transmission to a core network.

One or more presentation components 804 may present data indications to a person or other device. Examples of presentation components 804 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the method comprising:

receiving, from a Base Station (BS), Downlink Control Information (DCI) on a Physical Downlink Control Channel (PDCCH), the DCI scheduling a reception of Downlink (DL) data on a Physical Downlink Shared Channel (PDSCH), the DCI including an indicator indicating a Hybrid Automatic Repeat reQuest (HARQ) process number;

receiving an RRC configuration including a first value indicating a number of a plurality of HARQ processes to be used for the reception of the DL data and a second value indicating how many of the plurality of HARQ processes do not need to have a corresponding HARQ feedback transmission; and determining whether to transmit a HARQ feedback for the DL data according to whether the HARQ process number is within a specific range configured by the BS, wherein the specific range is determined based on a combination of the first value and the second value.

2. The method of claim 1, further comprising:
instructing, by a Medium Access Control (MAC) entity of the UE, a Physical (PHY) layer of the UE to flush a soft buffer corresponding to a HARQ process for the PDSCH when the UE determines not to transmit the HARQ feedback for the DL data.

3. The method of claim 1, further comprising:
instructing, by a Medium Access Control (MAC) entity of the UE, a Physical (PHY) layer of the UE to perform a HARQ process in which the PHY layer skips the transmission of the HARQ feedback for the DL data when the UE determines not to transmit the HARQ feedback for the DL data.

4. A User Equipment (UE), comprising:
at least one processor; and
at least one non-transitory computer-readable medium coupled to the at least one processor and storing one or more computer-executable instructions that, when executed by the at least one processor, cause the UE to:
 receive, from a Base Station (BS), Downlink Control Information (DCI) on a Physical Downlink Control Channel (PDCCH), the DCI scheduling a reception of Downlink (DL) data on a Physical Downlink Shared Channel (PDSCH), the DCI including an indicator indicating a Hybrid Automatic Repeat reQuest (HARQ) process number;
 receive an RRC configuration including a first value indicating a number of a plurality of HARQ processes to be used for the reception of the DL data and a second value indicating how many of the plurality of HARQ processes do not need to have a corresponding HARQ feedback transmission; and
 determine whether to transmit a HARQ feedback for the DL data according to whether the HARQ process number is within a specific range configured by the BS, wherein the specific range is determined based on a combination of the first value and the second value.

5. The UE of claim 4, wherein the one or more computer-executable instructions, when executed by the at least one processor, further cause the UE to:
instruct, by a Medium Access Control (MAC) entity of the UE, a Physical (PHY) layer of the UE to flush a soft buffer corresponding to a HARQ process for the PDSCH when the UE determines not to transmit the HARQ feedback for the DL data.

6. The UE of claim 4, wherein the one or more computer-executable instructions, when executed by the at least one processor, further cause the UE to:
instruct, by a Medium Access Control (MAC) entity of the UE, a Physical (PHY) layer of the UE to perform a HARQ process in which the PHY layer skips the transmission of the HARQ feedback for the DL data when the UE determines not to transmit the HARQ feedback for the DL data.

\* \* \* \* \*